United States Patent
Nishimura et al.

(10) Patent No.: US 8,604,755 B2
(45) Date of Patent: Dec. 10, 2013

(54) LITHIUM-ION SECONDARY BATTERY SYSTEM

(75) Inventors: Etsuko Nishimura, Hitachiota (JP);
Katsunori Nishimura, Hitachiota (JP);
Akihide Tanaka, Hitachinaka (JP)

(73) Assignee: Hitachi Vehicle Energy, Ltd., Hitachinaka-shi (JP)

( * ) Notice: Subject to any disclaimer, the term of this patent is extended or adjusted under 35 U.S.C. 154(b) by 536 days.

(21) Appl. No.: 13/022,718

(22) Filed: Feb. 8, 2011

(65) Prior Publication Data

US 2011/0193529 A1 Aug. 11, 2011

(30) Foreign Application Priority Data

Feb. 9, 2010 (JP) .................................. 2010-026097

(51) Int. Cl.
*H02J 7/00* (2006.01)
*H02J 7/04* (2006.01)
*G01R 31/36* (2006.01)

(52) U.S. Cl.
USPC .............................. 320/132; 320/157; 702/63

(58) Field of Classification Search
USPC .............................. 320/130, 132, 157; 702/63
See application file for complete search history.

(56) References Cited

U.S. PATENT DOCUMENTS

| | | | | |
|---|---|---|---|---|
| 5,545,969 | A * | 8/1996 | Hasegawa | 320/134 |
| 6,756,767 | B2 * | 6/2004 | Kawai | 320/125 |
| 7,459,884 | B2 * | 12/2008 | Sasaki et al. | 320/132 |
| 7,944,178 | B2 * | 5/2011 | Tamezane | 320/132 |
| 7,974,796 | B2 * | 7/2011 | Tamai | 702/63 |

FOREIGN PATENT DOCUMENTS

| | | |
|---|---|---|
| JP | 6-36760 A | 2/1994 |
| JP | 7-79535 A | 3/1995 |
| JP | 2000-23388 A | 1/2000 |
| JP | 3068712 B2 | 5/2000 |
| JP | 2001-52760 A | 2/2001 |
| JP | 2004-303674 A | 10/2004 |
| JP | 2005-32593 A | 2/2005 |
| JP | 2006-148997 A | 6/2006 |
| JP | 4069784 B2 | 1/2008 |
| JP | 4215202 B2 | 11/2008 |
| JP | 2009-117240 A | 5/2009 |

OTHER PUBLICATIONS

Japanese Office Action with partial English translation dated Apr. 17, 2012 (five (5) pages).

* cited by examiner

*Primary Examiner* — Richard V Muralidar
(74) *Attorney, Agent, or Firm* — Crowell & Moring LLP

(57) ABSTRACT

A lithium-ion secondary battery system is provided which can improve the cycle life and the storage property of a lithium-ion secondary battery and can decrease a discharge capacity which cannot be recharged. The lithium-ion secondary battery system includes a lithium-ion secondary battery having a cathode, an anode including carbon, and a non-aqueous electrolyte; a charge/discharge circuit for putting the lithium-ion secondary battery on charge according to a charge control parameter; and an arithmetic processing section for controlling the charge/discharge circuit. The arithmetic processing section obtains battery characteristics of the lithium-ion secondary battery, changes a value of the charge control parameter when the arithmetic processing section determines that the battery characteristics satisfies a condition for changing the charge control parameter, and restores the value of the charge control parameter to the value before the change when the charge for the lithium-ion secondary battery is finished.

12 Claims, 8 Drawing Sheets

LITHIUM-ION SECONDARY BATTERY SYSTEM

CLAIM OF PRIORITY

The present application claims priority from Japanese Patent Application JP 2010-026097 filed on Feb. 9, 2010, the content of which is hereby incorporated by reference into this application.

FIELD OF THE INVENTION

The present invention relates to a lithium-ion secondary battery system and a lithium-ion secondary battery used therein.

BACKGROUND OF THE INVENTION

Rechargeable batteries with non-aqueous electrolytes, represented by lithium-ion secondary batteries, attract attention as batteries for electric vehicles and energy storage because the batteries have high specific energy density. The electric vehicle using lithium-ion secondary battery includes a zero-emission electric vehicle which does not mount an engine, a hybrid electric vehicle which mounts both an engine and a secondary battery and, moreover, a plug-in hybrid electric vehicle which is directly charged from a system power source. An application as a stationary electric power storage system is also expected, which supplies electric power in emergency when an electric power system is shut off.

For these various applications, high capacity density and excellent durability are required for the lithium-ion secondary battery. More specifically, the lithium-ion secondary battery is required which has a high charge capacity, low falling rate of a chargeable capacity even when environmental temperature becomes high, and high capacity retention for long periods. Particularly, large electric energy charged in one-time charge is primarily required for the lithium-ion secondary battery for the electric vehicle. As one of the solutions, an anode material having a high capacity is required. Storage property and cycle life are secondary important required performance at high-temperature environment over 60° C. which is caused by radiant heat from a road surface or heat conduction from inside of a vehicle.

Many materials are known as carbonaceous anode material related to high capacity density. Among them, an art in which rapid voltage reduction at the end stage of discharge is avoided and an art which provides a high capacity battery by mixing a plurality of carbon materials are disclosed.

Japanese Patent No. 3068712 describes an invention in which high and flat discharge potential can be maintained by using an anode made by mixing graphite to 5 to 30% by volume of other carbonaceous material and sudden voltage reduction is prevented by moderately decreasing the voltage between both electrodes when a retention capacity becomes very low during operation of a battery.

Japanese Patent No. 4069784 describes an invention in which a voltage change caused by polarization of the anode at the end stage of discharge is suppressed and a capacity which the anode material itself has is fully utilizable by using a mixed anode made of a graphite-based material and a non-graphite-based material having a higher discharge capacity than the graphite-based material.

Japanese Patent No. 4215202 describes an invention in which capacity deterioration and an increase in internal resistance are suppressed minimally by using an anode made of a graphitizable carbon material which is not fully graphitized and graphite, even when pulse charge-discharge in large current is repeated for long periods, and thereby the longer life can be obtained.

Japanese Patent Application Laid-Open Publication No. 2009-117240 describes an invention which provides a carbon material of an anode of a lithium-ion secondary battery maintaining high capacity density and also having excellent input-output characteristic by using a mixed anode made by graphite and graphite whose surface is modified with a low crystallinity carbon material.

A technique is also proposed which maintains a capacity of a lithium-ion secondary battery by controlling charge conditions.

For example, Japanese Patent Application Laid-Open Publication No. 7-79535 describes an invention in which additional charge is performed when a retention capacity of a battery during charge is detected by using a detection section for the retention capacity of the battery.

Moreover, Japanese Patent Application Laid-Open Publication No. 2000-23388 describes an invention related with a control for increasing the charge capacity in a manner that measures times of charge-discharge or an elapsed time after installing a system and a voltage value and raises charge termination voltage (constant voltage) of a charge circuit to a predetermined voltage value in stages.

A lithium-ion secondary battery for electric vehicles or energy storage may be left at high temperature in a charged state. When the battery is left in such conditions, a decrease in discharge capacity (a charge-discharge capacity) is caused. Among these decreased capacities, there are a capacity which can be recharged and a capacity which cannot be recharged. An object of the present invention is to provide a lithium-ion secondary battery system which can improve the cycle life and the storage property of the lithium-ion secondary battery and can decrease a discharge capacity which cannot be recharged and to provide the lithium-ion secondary battery used in the system.

SUMMARY OF THE INVENTION

The inventors have made intensive investigation to resolve the above-described problem and have focused attention on a change over time in a discharge curve of a rechargeable battery with non-aqueous electrolyte (mainly a lithium-ion secondary battery) having a cathode, an anode including carbon, and a non-aqueous electrolyte or a battery system made of a plurality of the batteries. The inventors have achieved to establish a method for performing charge control in order to recover the discharge capacity when the discharge curve is changed and a system for performing the method.

According to a first aspect of the present invention, a lithium-ion secondary battery system includes a lithium-ion secondary battery having a cathode, an anode including carbon, and a non-aqueous electrolyte; a charge/discharge circuit for putting the lithium-ion secondary battery on charge according to a charge control parameter; and an arithmetic processing section for controlling the charge/discharge circuit. The arithmetic processing section obtains battery characteristics of the lithium-ion secondary battery, changes a value of the charge control parameter when the arithmetic processing section determines that the battery characteristics satisfies a condition for changing the charge control parameter, and restores the value of the charge control parameter to the value before the change when the charge for the lithium-ion secondary battery is finished.

According to a second aspect of the present invention, the lithium-ion secondary battery system of the first aspect of the present invention includes the arithmetic processing section that obtains an integrated value of the discharge capacity and a ratio of an amount of voltage change and a discharge capacity as the battery characteristics, changes the value of the charge control parameter when the arithmetic processing section determines that the ratio and the integrated value satisfy respective conditions for changing the charge control parameter, and restores the value of the charge control parameter to the value before the change when the charge for the lithium-ion secondary battery is finished.

According to a third aspect of the present invention, the lithium-ion secondary battery system of the second aspect of the present invention includes the arithmetic processing section that increases time or voltage of constant-voltage charge which is the charge control parameter when the arithmetic processing section determines that the ratio and the integrated value satisfy respective conditions for changing the charge control parameter, and restores the time or the voltage of the constant-voltage charge to the value before the change when the charge for the lithium-ion secondary battery is finished.

According to a forth aspect of the present invention, the lithium-ion secondary battery system of the first aspect of the present invention includes the arithmetic processing section that obtains an integrated value of the discharge capacity and a ratio of an amount of temperature change in time and a discharge capacity as the battery characteristics, increases time or voltage of constant-voltage charge which is the charge control parameter when the arithmetic processing section determines that the ratio and the integrated value satisfy respective conditions for changing the charge control parameter, and restores the time or the voltage of the constant-voltage charge to the value before the change when the charge for the lithium-ion secondary battery is finished.

According to a fifth aspect of the present invention, the lithium-ion secondary battery system of the first aspect of the present invention includes the arithmetic processing section that obtains an integrated value of the discharge capacity and a ratio of a width of voltage change and a width of initial voltage change as the battery characteristics, increases time or voltage of constant-voltage charge which is the charge control parameter when the arithmetic processing section determines that the ratio and the integrated value satisfy respective conditions for changing the charge control parameter, and restores the time or the voltage of the constant-voltage charge to the value before the change when the charge for the lithium-ion secondary battery is finished.

According to a sixth aspect of the present invention, the lithium-ion secondary battery system of the first aspect of the present invention includes the arithmetic processing section that is detachable.

According to a seventh aspect of the present invention, the lithium-ion secondary battery system of the first aspect of the present invention has the anode that includes a mixture of graphite and non-graphite carbon as an anode active material, and the cathode and the anode that have different ratios of an amount of voltage change and a discharge capacity from each other.

According to an eighth aspect of the present invention, the lithium-ion secondary battery system of the seventh aspect of the present invention has a charge capacity density per unit weight of the anode active material that is 250 to 330 mAh/g when the lithium-ion secondary battery is charged to a rated capacity.

According to the present invention, a decrease in the discharge capacity of the lithium-ion secondary battery can be suppressed.

DETAILED DESCRIPTION OF THE PREFERRED EMBODIMENTS

A representative example of rechargeable batteries with non-aqueous electrolytes which the present invention includes is a lithium-ion secondary battery. In the present specification, an electrolyte dissolved in a non-aqueous solvent is referred to as a "non-aqueous electrolyte".

Figure 1:
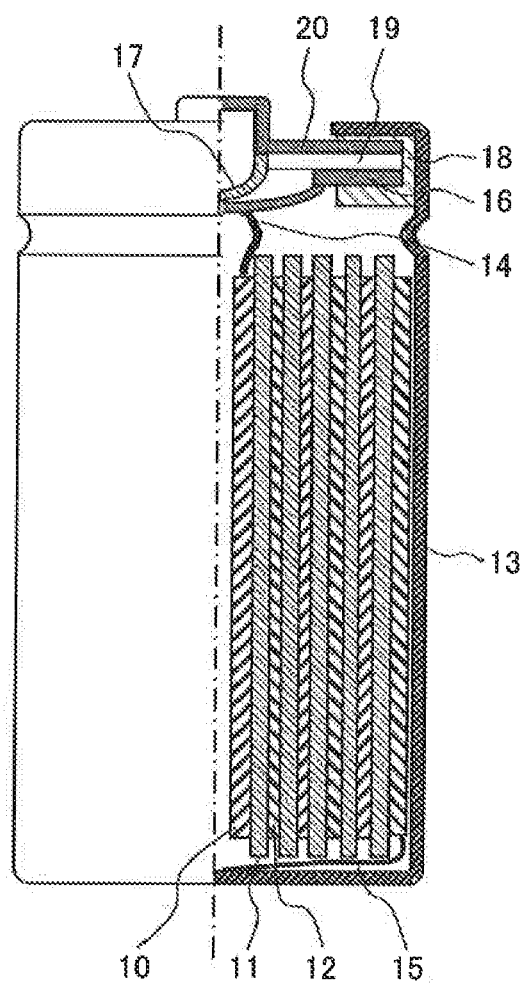
FIG. 1 is a partial cross-sectional view of a cylindrical lithium-ion secondary battery according to an embodiment of the present invention.

FIG. 1 is a partial cross-sectional view of a cylindrical lithium-ion secondary battery according to an embodiment of the present invention. The cylindrical lithium-ion secondary battery includes a cathode 10, a separator 11, an anode 12, a battery container (the same meaning of a battery can) 13, a cathode collector tab 14, an anode collector tab 15, an inner lid 16, an inner pressure release valve 17, a gasket 18, a positive temperature coefficient (PTC) resistance element 19 and a battery lid 20. The battery lid 20 is an integrated component made of the inner lid 16, the inner pressure release valve 17, the gasket 18 and the PTC resistance element 19.

The cathode 10 includes a cathode active material, a conducting material, a binder and a collector. Representative examples of the cathode active material include $LiCoO_2$, $LiNiO_2$ and $LiMn_2O_4$. $LiMnO_3$, $LiMn_2O_3$, $LiMnO_2$, $Li_4Mn_5O_{12}$, $LiMn_{2-x}M_xO_2$ (here, M=Co, Ni, Fe, Cr, Zn, Ta; x=0.01-0.2), $Li_2Mn_3MO_8$ (here, M=Fe, Co, Ni, Cu, Zn), $Li_{1-x}A_xMn_2O_4$ (here, A=Mg, B, Al, Fe, Co, Ni, Cr, Zn, Ca; x=0.01-0.1), $LiNi_{1-x}M_xO_2$ (here, M=Co, Fe, Ga; x=0.01-0.2), $LiFeO_2$, $Fe_2(SO_4)_3$, $LiCO_{1-x}M_xO_2$ (here, M=Ni, Fe, Mn; x=0.01-0.2), $LiNi_{1-x}M_xO_2$ (here, M=Mn, Fe, Co, Al, Ga, Ca, Mg; x=0.01-0.2), $Fe(MoO_4)_3$, $FeF_3$, $LiFePO_4$, $LiMnPO_4$ and the like can be enumerated as other examples. $LiNi_{1/3}Mn_{1/3}CO_{1/3}O_2$ is selected as the cathode active material in embodiments below. The lithium-ion secondary battery according to the present invention has not any limitation to the cathode materials. Therefore, the cathode active material is not limited to these materials.

Particle size of the cathode active material is defined such that the particle size is equal to or smaller than the thickness of a mixture layer formed from the cathode active material, the conducting material and the binder. When there are coarse particles having a size equal or larger than the thickness of the mixture layer in the powder of the cathode active material, the coarse particles are previously removed by sieve classification or airflow classification to prepare particles having a size equal to or smaller than the thickness of the mixture layer.

The cathode active material has high electric resistance because the material is generally an oxide-based material, so that the conducting material made of carbon powder is used for compensating electric conductivity. Since both the cathode active material and the conducting material are in the form of powder, the powder is bound each other and, at the same time, is adhered to the collector by mixing the binder with the powder.

An aluminum foil having a thickness of 10 to 100 μm, a punched foil made of aluminum having a thickness of 10 to 100 μm and a hole diameter of 0.1 to 10 mm, expanded metal, a foamed metal plate or the like is used for the collector of the cathode 10. Materials such as stainless steel, titanium or the like are applicable other than aluminum. In the present invention, materials, shapes, methods for manufacturing and the like are not limited and any collector can be used.

The cathode 10 can be prepared in a manner that, after a slurry for the cathode made by mixing the cathode active material, the conducting material, the binder and an organic solvent is attached to the collector by a doctor blade method, a dipping method, a spray method or the like, the organic solvent is dried and then pressure forming is performed by using a roll press. A multilayer mixture layers can be formed on the collector by performing the process from applying to drying in several times.

The anode 12 includes an anode active material, a binder and a collector. A conducting material may be added to the anode 12 when high rate charge-discharge is required. The anode active material applicable in the present invention can be selected from one of graphite or non-graphite carbon, or a mixture of graphite and non-graphite carbon.

The graphite used in the anode 12 is prepared from natural graphite, artificial graphite, mesophase carbon, expanded graphite, carbon fibers, carbon fibers made by vapor phase growth method, pitch-based carbonaceous materials, needle coke, petroleum coke, polyacrylonitrile-based carbon fibers and the like, which can chemically occlude and release lithium ions, as a raw material. An interval of graphite layers determined by an X-ray structure analysis method is preferably from 0.335 to 0.339 nm.

The non-graphite carbon used in the anode 12 is a carbon material except the above-described graphite, and can occlude and release lithium ions. The non-graphite carbon includes a carbon material which has an interval of the graphite layers of 0.34 nm or more and turns into graphite by high-temperature thermal treatment at 2000° C. or higher; cyclic hydrocarbons having five-membered ring or six-membered ring; and an amorphous carbon material synthesized by thermal decomposition of a oxygen-containing cyclic organic compound. A material having different discharge curve from a discharge curve of the graphite anode is preferably selected as a non-graphite material. Graphitizable carbon is used as the non-graphite carbon in the embodiments described below.

A material made by mixing graphite and non-graphite carbon in a weight ratio of 0.5 to 0.9 is used as an anode active material in the anode 12. When charge capacity density per unit weight of the whole anode active material is set to 250 to 330 mAh/g at the time of charge to a rated capacity, the anode 12 becomes high capacity and has a moderate voltage change at the end stage of discharge. When a rate of voltage change (a width of voltage change to the discharge capacity (an amount of change in battery voltage)) at the end stage of discharge is different between the anode 12 and the cathode 10, a potential change of the electrode having higher rate of voltage change is generated in discharge voltage of the battery from a shape of a discharge voltage curve of the battery. As a result, it can be distinguished from a discharge curve at the end stage of discharge that which electrode determines discharge termination and controls the discharge capacity of the battery. Particularly, a phenomenon is observed that a shape of the discharge voltage curve of the battery changes, when charge level of an electrode having larger self-discharge current is shifted to a discharge side in the case that the self-discharge current is different between the cathode 10 and the anode 12.

A material which forms an alloy with lithium or a material which forms an intermetallic compound with lithium may be added as a third anode active material to the anode 12 which has different rate of voltage change from the cathode 10 as described above. Examples of the third anode active material include metals such as aluminum, silicon and tin, alloys thereof, transition metal nitride containing lithium $Li_{(3-x)}M_xN$, lower oxides of silicon $Li_xSiO_y$ ($x \leq 0$, $2 > y > 0$) and lower oxides of tin $Li_xSnO_y$. A material of the third anode active material is not particularly limited, and materials other than the materials described above can be used.

Since the anode active material is generally in the form of powder, the powder is bound each other and, at the same time, is attached to the collector by mixing the binder with the powder. Particle size of the anode active material is preferably equal to or smaller than the thickness of a mixture layer formed from the anode active material and the binder in the anode 12 of the lithium-ion secondary battery according to the present invention. When there are coarse particles having larger size than the thickness of the mixture layer in the powder of the anode active material, the coarse particles are previously removed by sieve classification or airflow classification to use particles having a size equal to or smaller than the thickness of the mixture layer.

An copper foil having a thickness of 10 to 100 μm, a punched foil made of copper having a thickness of 10 to 100 μm and a hole diameter of 0.1 to 10 mm, expanded metal, a foamed metal plate or the like is used for a collector of the anode 12. Materials such as stainless steel, titanium, nickel or the like is applicable other than copper. In the present invention, materials, shapes and methods for manufacturing and the like are not limited and any collector can be used.

The anode 12 can be prepared in a manner that, after a slurry for the anode made by mixing the anode active material, the binder and an organic solvent is attached to the collector by a doctor blade method, a dipping method, a spray method or the like, the organic solvent is dried and then pressure forming is performed by using a roll press. A multilayer mixture layer can be formed on the collector by performing the process from applying to drying in several times.

A separator 11 is inserted between the cathode 10 and the anode 12 prepared by the above-described methods to prevent short circuit between cathode 10 and the anode 12. A polyolefinic polymer sheet made of polyethylene, polypropylene or the like, or a bilayer structure formed by welding a polyolefinic polymer with a fluorinated polymer sheet represented by polytetrafluoroethylene can be used for the separator 11. A mixture of a ceramic and the binder may be formed as a thin layer on the surface of the separator 11 so as not to shrink the separator 11 when battery temperature becomes high. Lithium ions need to permeate these separators 11 at the time of charge-discharge of the battery. Therefore, the separator 11 can be used for the lithium-ion secondary battery when the separator 11 generally has a pore size of 0.01 to 10 μm and a porosity of 20 to 90%.

A group of electrodes in which such a separator 11 is inserted between the cathode 10 and the anode 12 are prepared. The group of electrodes can be formed in various shapes such as a group laminating rectangle electrodes, a group winding the cathode 10 and the anode 12 in any shape such as flat shape or the like other than a cylindrical shape shown in FIG. 1. A shape of the battery container 13 may be selected from a cylindrical shape, a flat elliptic (rounded rectangle) shape, a rectangular shape or the like in accordance with the shape of the group of electrodes.

A material of the battery container 13 is selected from a material having corrosion resistance to the non-aqueous electrolyte such as aluminum, stainless steel and nickel-plated steel. When the battery container 13 is electrically connected to the cathode 10 or the anode 12, the material of the battery container 13 is selected so as not to cause deterioration of the material caused by corrosion of the battery container 13 or alloy formation with lithium ions at the part in contact with the non-aqueous electrolyte.

The group of electrodes is stored in the battery container 13. The anode collector tab 15 is connected to an inner wall of the battery container 13 and the cathode collector tab 14 is connected to the bottom surface of the battery lid 20. The electrolytic solution is poured into the group of electrodes before the battery is sealed. A method for pouring the electrolytic solution includes a method in which the electrolytic solution is directly poured into the group of electrodes with battery lid 20 being opened, or a method in which the electrolytic solution is poured through an inlet port placed in the battery lid 20.

Subsequently, the battery lid 20 is attached firmly to the battery container 13 and the whole battery is sealed. When there is an inlet port for the electrolytic solution, the inlet port is also sealed. There are known arts such as welding and swaging as a method for sealing the battery.

Representative example of the electrolytic solution which is possible to use in the present invention includes a solution made by dissolving lithium hexafluorophosphate ($LiPF_6$) or lithium fluoroborate ($LiBF_4$) as an electrolyte into a solvent made by mixing dimethyl carbonate, diethyl carbonate, methyl ethyl carbonate or the like with ethylene carbonate. In the present invention, types of solvents and electrolytes and mixing ratios of the solvents are not limited, and other electrolytic solutions can be used. The electrolyte can also be used in a state in which the electrolyte is included in ion-conducting polymers such as polyvinylidenefluoride and ethylene oxide. In this case, the separator 11 is not necessary.

Examples of non-aqueous solvents which can be used for the electrolytic solution include propylene carbonate, ethylene carbonate, butylene carbonate, vinylene carbonate, γ-butyrolactone, dimethyl carbonate, diethyl carbonate, methyl ethyl carbonate, 1,2-dimethoxy ethane, 2-methyl tetrahydrofuran, dimethylsulfoxide, 1,3-dioxolan, formamide, dimethyl formamide, methyl propionate, ethyl propionate, phosphoric acid triesters, trimethoxymethane, dioxolan, diethylether, sulfolane, 3-methyl-2-oxazolidinone, tetrahydrofuran, 1,2-diethoxyethane, chloroethylene carbonate, or chloropropylene carbonate. Other solvents can be used as long as these other solvents are not decomposed on the cathode 10 or the anode 12 which is embedded in the battery of the present invention.

Examples of the electrolyte include many types of lithium salts such as $LiPF_6$, $LiBF_4$, $LiClO_4$, $LiCF_3SO_3$, $LiCF_3CO_2$, $LiAsF_6$, $LiSbF_6$ or imide salts of lithium represented by lithium trifluoromethanesulfonimide. A non-aqueous electrolytic solution which is made by dissolving these salts into the above-described solvents can be used for an electrolytic solution for the battery. Other electrolytes can be used as long as these other electrolytes are not decomposed on the cathode 10 or the anode 12 which is embedded in the battery of the present invention.

When a solid polyelectrolyte (a polymer electrolyte) is used, ion-conducting polymers such as polyethylene oxide of ethylene oxide, acrylonitrile, polyvinylidene fluoride, methyl methacrylate or hexafluoropropylene can be used for the electrolyte. There is an advantage that the separator 11 can be eliminated when these solid polyelectrolytes are used.

Moreover, an ionic liquid can be used. For example, a combination of substances which is not decomposed on the cathode 10 and anode 12 is selected from 1-ethyl-3-methylimidazolium tetrafluoroborate ($EMI-BF_4$); a mixed complex of a lithium salt $LiN(SO_2CF_3)_2$ (LiTFSI), triglyme and tetraglyme; and cyclic quaternary ammonium-based cation (N-methyl-N-propylpyrrolidinium is exemplified) and imide-based anion (bis(fluorosulfonyl) imide is exemplified) can be used for the lithium-ion secondary battery according to the present invention.

A shape of the lithium-ion secondary battery according to the present invention may be any shape such as flat elliptic (rounded rectangle) shape, a rectangular shape or the like, in addition to the cylindrical shape shown in FIG. 1. The shape of the battery does not impinge on the present invention at all when the present invention is worked.

Figure 2:
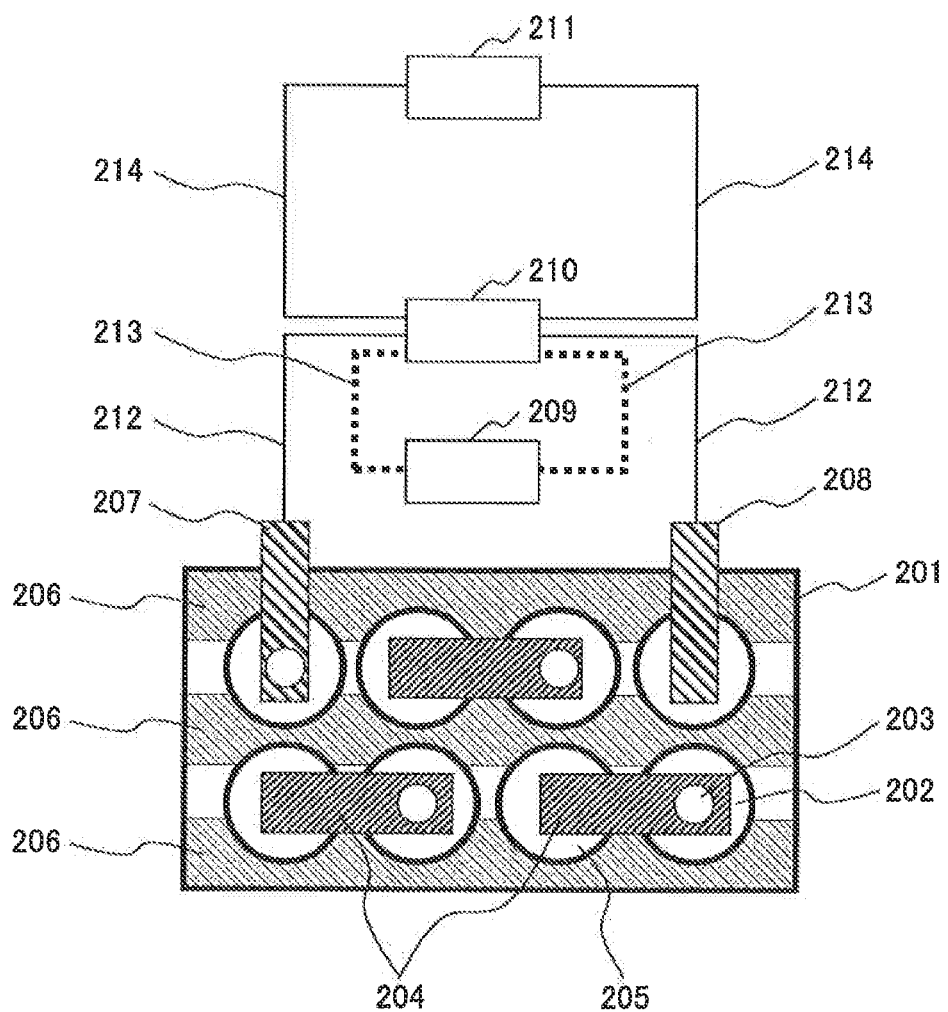
FIG. 2 shows an example of a structure of a lithium-ion secondary battery system according to an embodiment of the present invention.

FIG. 2 shows an example of a structure of a lithium-ion secondary battery system according to an embodiment of the present invention. The lithium-ion secondary battery system includes a module 201, a charge/discharge circuit 210 and an arithmetic processing section 209.

The module 201 is a module in which eight cylindrical lithium-ion secondary batteries 202 shown in FIG. 1 (each of battery is hereinafter referred to as "a single battery") are connected in series. The battery lid 20 in FIG. 1 is indicated as a cathode terminal 203 in FIG. 2. The cathode terminal 203 is connected to an adjacent battery can 205 through a bus bar 204. In FIG. 2, there are four cathode terminals 203 and four battery cans 205, and the bus bars 204 are welded so as to connect three pairs of the cathode terminal 203 to the battery can 205. In this figure, each of two bus bars 204 is attached to two of four batteries in the lower portion, and a bus bar is disposed to two central batteries in the upper portion.

FIG. 2 is a view in which the module 201 is seen from the front and four bus bars are provided in the opposite side of the module 201 (not shown). Therefore, eight single batteries 202 are connected in series in total. The eight single batteries 202 are fixed with a supporting component 206.

A cathode external terminal 207 is connected to the end of the cathode and an anode external terminal 208 is connected to the end of the anode in the single batteries 202 connected in series.

The cathode external terminal 207 and the anode external terminal 208 are connected to the charge/discharge circuit 210 which controls both charge and discharge of the single battery 202 through an electric power line 212. The charge/discharge circuit 210 can be connected to an external device 211 through an external electric power cable 214.

At the time of putting the single battery 202 on charge, electric power is supplied to the charge/discharge circuit 210 using the external device 211 which acts as an external power source for direct current or alternating current. When the external device 211 is an alternating-current power source, an inverter (an AC-DC converter) is attached to the charge/discharge circuit 210 or an external inverter is placed at a midpoint of the external electric power cable 214.

If the external device 211 is replaced with an external load and the charge/discharge circuit 210 is operated so as to discharge the module 201, electric power can be supplied to the external device 211. When the external device 211 is an electric device for alternating current, an inverter (an AC-DC converter) is placed at a midpoint of the external power cable 214 or an inverter function is previously added to the charge/discharge circuit 210.

Electric power can be taken out from the module 201 or the module 201 can be charged by operating the charge/discharge circuit 210 as described above.

The arithmetic processing section 209 is connected to the charge/discharge circuit 210 through a signal line 213 to control the charge/discharge circuit 210. Specifically, a measured value of the voltage of the whole module 201 is received as a signal from the charge/discharge circuit 210. Then, the arithmetic processing section 209 carries out calculation based on the received signal, and a signal for changing a charge control parameter which is used when charging the single battery 202 is sent to the charge/discharge circuit through the signal line 213 based on the calculation result.

The charge control parameter refers to a parameter representing a charge condition when each single battery 202 or the whole module 201 is charged. For example, the charge control parameter includes charging time and charging voltage.

The arithmetic processing section 209 may be detachable from the charge/discharge circuit 210 or may be incorporated inside the system. In the embodiments described below, the arithmetic processing section 209 is adjacently placed to the charge/discharge circuit 210 and incorporated inside the system.

Here, the arithmetic processing section 209 is configured to receive the measured value of the voltage of the whole module 201 through the signal line 212, the charge/discharge circuit 210 and the electric power line 213. It is also possible that the arithmetic processing section 209 loads voltage signals of each single battery 202 individually by connecting signal lines for measuring voltage of each single battery 202 to the arithmetic processing section 209 or the charge/discharge circuit 210, and the arithmetic processing section 209 performs arithmetic processing.

When a temperature measuring means, such as a thermocouple or a thermistor, is provided to the single battery 202 and the signal of measured temperature is loaded into the charge/discharge circuit 210 or the arithmetic processing section 209 through a separately provided signal line, the temperature of the single battery 202 can be calculated and processed. Also in this case, temperature of each single battery 202 can individually be measured and the measured temperature is calculated and processed by the arithmetic processing section 209.

Moreover, the arithmetic processing section 209 can measure and integrate charge-discharge time, downtime (standby time) and disuse time of the module 201 through the charge/discharge circuit 210 and can calculate and process depending on the integrated time. Such a measuring and integrating function may be added to the arithmetic processing section 209. The downtime or the disuse time of the module 201 may be eliminated from the integrated time as long as this time does not impinge on a capacity decrease in the battery.

Moreover, charge-discharge can be controlled depending on the state of the single battery 202 by loading any signal which shows the state of the container of the single battery 202 or the module 201 (which means a physical signal such as voltage, current or temperature) into the charge/discharge circuit 210 or the arithmetic processing section 209 through a separately provided signal line. For example, when the air is blown into the module 201 or the cooling medium is circulated inside the module 201, power (electric power consumption) of an auxiliary machine for sending air or cooling medium and temperature of a space between the container of the module 201 and the single battery 202 can be loaded into the charge/discharge circuit 210 or the arithmetic processing section 209 through the signal line.

Then, an operation principle will be described when the arithmetic processing section 209 sends a signal to the charge/discharge circuit 210 based on a voltage signal of the single battery 202 to change the charge control parameter.

A lithium-ion secondary battery (a single battery) is prepared where the cathode active material includes $LiNi_{1/3}Mn_{1/3}CO_{1/3}O_2$, which is a solid solution of nickel, manganese and cobalt, and the anode active material includes natural graphite and graphitizable carbon. In a composition of the anode material, a ratio by weight of the natural graphite and the graphitizable carbon is set to 90:10. This lithium-ion secondary battery is charged at a current value (15A) corresponding to one-hour rate for the start and then at a constant voltage of 4.2 V for one hour.

Figure 3:
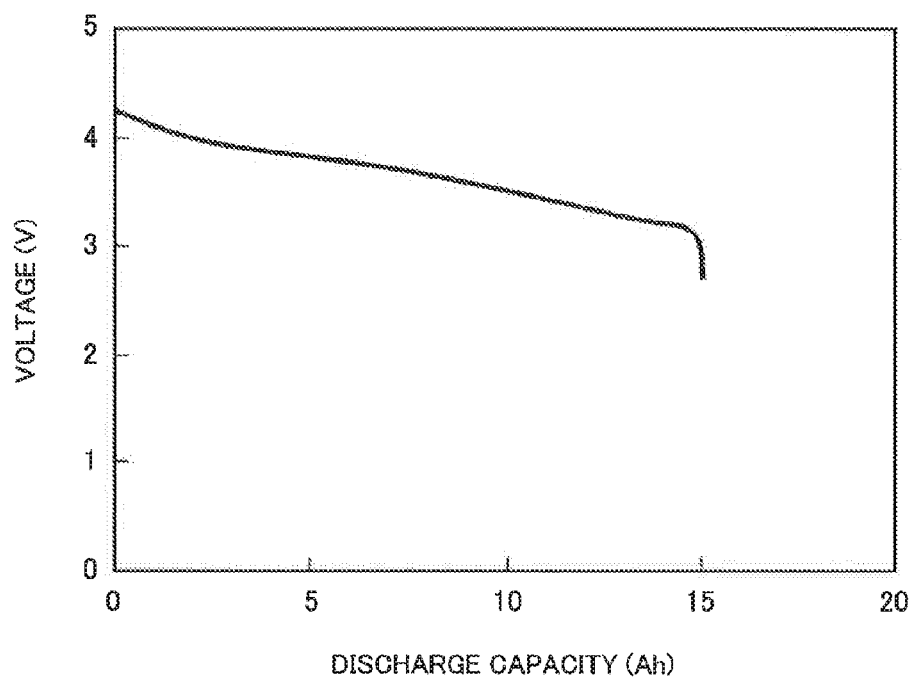
FIG. 3 is an initial discharge curve of the cylindrical lithium-ion secondary battery according to an embodiment of the present invention.

FIG. 3 is an initial discharge curve of the lithium-ion secondary battery when the battery is discharged at a condition of 0.5-hour rate (7.5 A as a discharging current). The horizontal axis represents the discharge capacity and the vertical axis represents the battery voltage. The discharge starts at about 4.2 V, which is the upper limit voltage at the charge described above. The voltage gradually decreases, and rapidly drops in the vicinity of a rated capacity of 15 Ah. The discharge finishes at a discharge termination voltage of 2.5V.

In the battery using a combination of the cathode and the anode in this embodiment, a characteristic is that the voltage change in the discharge curve becomes noticeably when the discharge capacity comes close to 15 Ah. It has been found from the shape of the discharge curve that the voltage change of the cathode is noticeably reflected.

Voltage of a battery is potential difference between a cathode and an anode. Accordingly, contribution of cathode potential and anode potential in a discharge curve of the battery can be figured out from a discharge curve of the cathode or the anode by using a three-electrode test cell in which lithium metal is used as a counter electrode and a reference electrode for each of the cathode and the anode.

A discharge curve which represents a relation between a discharge capacity and potential of the cathode can be obtained by the following procedure. First, a discharge curve is obtained by discharging the cathode such that the current density becomes as same as the above-described discharge curve of the battery. This discharge curve is transformed to a curve of the discharge capacity and the potential which are converted into values per area of the cathode actually used in the battery. A change in the end stage of discharge in this curve appears in the end stage of discharge of the battery. Generally, discharge voltage of a battery reaches a specified value by a decrease in discharge potential of the cathode because the anode has an irreversible capacity.

Voltage at discharge termination of the battery may be determined by discharge potential of the anode, because the charge level of the anode gradually decreases when self-discharge of the anode proceeds. In order to figure out such a state change in the battery, a curve of the discharge capacity and the potential of the anode should be obtained by a test using the above-described three-electrode test cell. When a charge level of the anode is decreased, a potential change of the anode at the end stage of discharge becomes to appear in the curve at the end stage of discharge of the battery. From the change in the discharge curve of the battery, it is determined that discharge termination of the battery is controlled by an increase in the anode potential.

Then, the above-described battery is charged to a capacity of 15 Ah and stored in a thermostatic chamber at 50° C. in a state of open circuit. After 60 days have passed, the battery is taken out from the thermostatic chamber and a charge-discharge cycle test is performed from discharge.

Figure 4:
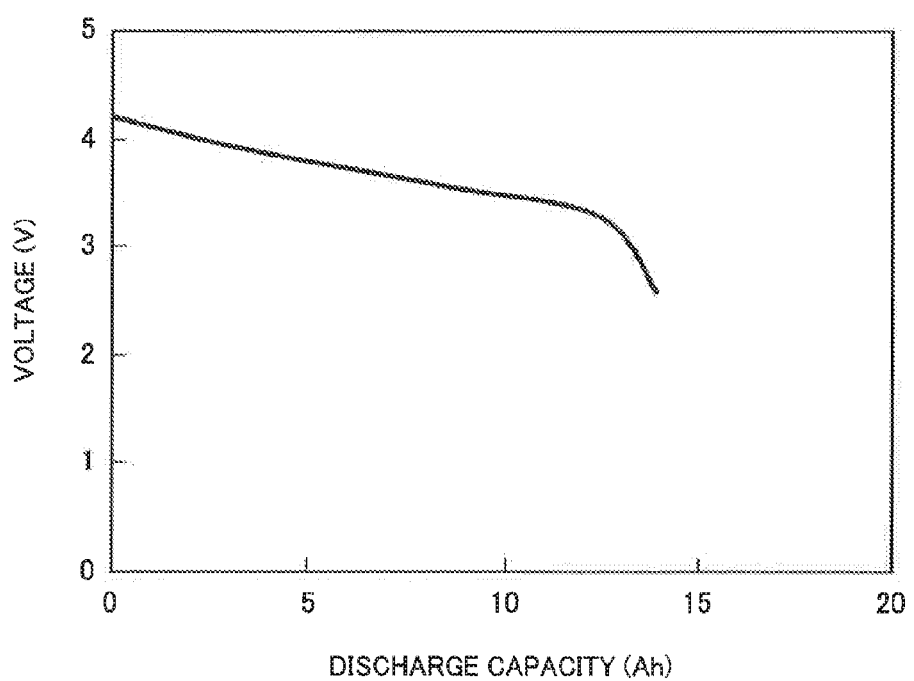
FIG. 4 is a discharge curve of the cylindrical lithium-ion secondary battery according to an embodiment of the present invention after a charge-discharge cycle test is performed.

FIG. 4 is a discharge curve obtained at the time of stable state after a charge-discharge cycle test is performed for the cylindrical lithium-ion secondary battery according to the embodiment of the present invention. The horizontal axis represents the discharge capacity and the vertical axis represents the battery voltage. When compared with FIG. 3, a clear difference is that the discharge capacity is decreased by about 10%, and the discharge curve at the end stage of discharge, in other words, the discharge curve in the discharge capacity at and over 12 Ah is changed. Since this change is closely resembled to the potential change of the anode at the end stage of discharge, the discharge termination of the battery is controlled by an increase in the anode potential.

The reason of the decrease in the discharge capacity is mainly because lithium ions stored in the anode and an electrolytic solution are reacted by a self-discharge reaction due to a storage test at 50° C., and thereby the lithium ions which are contributed to the charge-discharge are deactivated. The charge level of the anode is decreased by this reaction. Moreover, these reactions inhibit diffusion of the lithium ions by growing a surface coating layer of the anode or flow of electrons by worsening contact of the particles of the anode active material. It is considered that, as a result, the discharge capacity (the charge-discharge capacity) of the battery is decreased.

Accordingly, in an actual system, if there is an operation mode for fully discharging, a state of the battery can be monitored by a decrease in the discharge capacity.

It is presumed that the change of the discharge curve at the end stage of discharge is caused by shifting the charge level of the anode to discharge side in the storage test because a self-discharge capacity of the anode described above is larger than a self-discharge capacity of the cathode. When the charge level of the anode gradually shifts to the discharge side compared with the cathode, a shape of the curve at the end stage of discharge of the anode starts to appear in the discharge curve of the whole battery.

The vertical axis in the graph of FIG. 4 is battery voltage and the battery voltage is provided by a difference between the potential of the cathode and the potential of the anode. The discharge curve of the anode is placed in lower potential, in around several tens of millivolts, at the initial stage of discharge. Accordingly, the potential of the anode, which is not shown in the graph, is close to 0 V in the vertical axis of FIG. 4.

The potential gradually rises with this anode being discharged. More specifically, the potential of the anode is shifted upward of the vertical axis of FIG. 4 with an increase in the discharge capacity. As a result, the battery voltage shown in FIG. 4 becomes gradually small with an increase in the discharge capacity.

At the end stage of discharge of the anode, an increase in voltage becomes noticeable. In the discharge curve of FIG. 4, the noticeable increase in voltage of the anode is represented as a decrease in the battery voltage. If an amount of change in the battery voltage to an unit step (a step size which a control circuit is to monitor) of the discharge capacity or an amount of change in the battery voltage per unit time is used for a method to determine whether a voltage change in a battery happens or not in an actual system, a curve at the end stage of discharge shown in FIG. 4 can be estimated even if the battery is not fully discharged.

As shown in FIG. 4, when a noticeable capacity decrease is caused by self-discharge, a discharge curve of the battery at the end stage of discharge may change. Therefore, a state of the battery can be monitored from the change in the discharge curve because a similar change can be observed not depending on a cathode material and an anode material.

A cause of such a change in the discharge curve is because self-discharge current (which is same as a rate of the self-discharge reaction) of either the anode or the cathode is large. Usually, the self-discharge current of the anode is larger because a decomposition rate of the electrolytic solution on the anode is faster than a decomposition rate of an electrolytic solution on the cathode. As a result, the charge level of the anode is shifted to discharge side, and the potential of the anode starts to affect a discharge curve at the end stage of discharge. If the self-discharge currents of the anode and the cathode are same, a change in the discharge curve at the end stage of discharge does not appear because the charge level of the anode and the cathode can be adjusted to the same level by recharging. However, charge-discharge failure will occur at some future by depletion of the electrolytic solution because of consumption of the electrolytic solution by this self discharge. Accordingly, it is noted that the above-described recharge is possible until an amount of the electrolytic solution required for charge-discharge exists in the battery. However, when an openable and closable inlet port for the electrolytic solution is equipped at the battery lid 20 shown in FIG. 1, the electrolytic solution can be replenished and the recharge is continuously possible without the above-described limitation.

On the contrary, when a condition in which the self-discharge current of the cathode becomes large is realized, a change which originated from the potential change of the cathode becomes to appear in the discharge curve at the end stage of discharge. More specifically, the discharge curve is affected by a combination of types of active materials used for the cathode and the anode and a composition of the electrolytic solution.

Subsequently, means will be described for recovering the discharge capacity when a decrease in discharge capacity occurs. The inventors have found out that, when a decrease in the discharge capacity is caused by a difference in self-discharge rates of the cathode and the anode, the battery capacity decreases due to incapability of charge, although the electrode active material itself is not deactivated. This is because, when the battery is left for some time, the potential of the anode is shifted to discharge side compared to the potential of the cathode, and the lithium ions vanish from the cathode in first at the time of recharge, so that the cathode is fully charged.

Generally, self-discharge current of an anode is larger than that of a cathode. Particularly, in the initial stage of the battery, the capacity of the battery decreases due to the self-discharge of the anode. However, when the potential is shifted to the discharge side by a gradual self-discharge of the anode, the decomposition reaction rate of the electrolytic solution becomes slow with an increase in the anode potential. Without changing the charge termination voltage, the potential of the cathode increases because the cathode is charged to high potential with an increase in the anode potential. Thus, the decomposition rate of the electrolytic solution on the cathode becomes fast, and this rate finally exceeds the decomposition rate of the electrolytic solution on the anode.

The present invention aims to decrease the difference in charge level between the cathode and the anode in a manner that estimates the potential of the anode from a change in the discharge curve at the end stage of discharge of the battery and charges the battery under such a condition that the self-discharge current of the cathode is larger than the self-discharge current of the anode. The capacity of the battery can be recovered by approximating the charge level of the battery to the initial state. The inventors have found out a method for adjusting the charge levels of the cathode and the anode to the same level when the charge levels of the both electrodes become different because of the difference of the self-discharge reaction rates. As one of the means of the method, the capacity difference can be decreased by selectively prolonging charging time when the capacity difference becomes large.

According to conventional techniques, a method which increases the charge capacity by raising the voltage of the battery has been used. When this method is used, the decomposed gas of an electrolytic solution rapidly accumulates in the battery because the decomposition of the electrolytic solution is accelerated on the cathode. As a result, a safety mechanism is worked due to an increase in internal pressure of the battery. Moreover, the electrolytic solution shortage occurs due to acceleration of the decomposition of the electrolytic solution.

In addition, a method in which recharge is performed in low battery voltage at the time of charge termination arises a problem that time for determining the termination of the charge is necessary and accumulated time thereof becomes large. When whole charging time including the time for determination becomes large, decomposition of the electrolytic solution is accelerated because a state of high charge level is continued. As a result, deterioration of the battery cannot be avoided. Moreover, a voltage change at the point of the charge termination is very small. Accordingly, for example, in the charge side in FIG. 3 or FIG. 4, the change should be detected within the range of several tens of millivolts and the charging time should be controlled. When accuracy of the measurement is intended to be increased, longer downtime after charge is required (usually the downtime is several tens of minutes). This causes prolongation of the charging time.

The present invention employs a completely different method from conventional arts. In the present invention, the battery characteristics are obtained from the discharge capacity or the discharge curve of the battery, and then a state of the battery is determined from these characteristics to recover the capacity by changing charge conditions. Quantities required for obtaining the battery characteristics include, for example, a discharge curve, a discharge capacity, voltage and temperature. The battery characteristics can be obtained by any other value if a quantity reflecting a possible discharge capacity of the battery, other than the above quantities, is measured and used as the value.

Examples of the battery characteristics include a discharge capacity of the battery when the battery can fully discharge and a change rate in the discharge voltage of the battery when the discharge capacity is estimated in the middle of a full discharge. In the embodiments described below, a ratio of an amount of voltage change (a width of voltage change) and a discharge capacity, a ratio of an amount of temperature change in time (a width of temperature change) and the discharge capacity, a ratio of a width of voltage change and a width of initial voltage change, and an integrated value of the discharge capacity are used as the battery characteristics. Impedance at specific frequency and a width of voltage change at the time of on-off action of the specific direct-current electricity can also be used as the battery characteristics.

The charge control parameter can be changed by obtaining a magnitude relation between a value of the battery characteristics and a predetermined control value and estimating an amount of a capacity decrease in the battery. In the present specification, a condition for changing the charge control parameter, in other words, the magnitude relation between the value of the battery characteristics and the control value is referred to as a condition for changing the charge control parameter. When plural charge control parameters exist, the condition for changing the charge control parameter can be set for each of the charge control parameters. The condition for changing the charge control parameter will be described in the embodiments below.

When the battery characteristics satisfy the condition for changing the charge control parameter, the arithmetic processing section 209 (see FIG. 2) sends a signal to the charge/discharge circuit 210 for changing the charge control parameter. The charge/discharge circuit 210, after receiving this signal, changes the charge control parameter and charges each single battery 202 or the whole module 201 in a new charge condition. When the charge is finished, the arithmetic processing section 209 sends a signal to the charge/discharge circuit 210 for restoring the charge control parameter to the original value (the value before the value was changed). The charge/discharge circuit 210, after receiving this signal, restores the charge control parameter to the original value and normally charges.

The arithmetic processing described above can be executed by an arithmetic device, such as a microcomputer.

In the lithium-ion secondary battery system according to the present invention, unnecessary prolongation of the charging time is avoided and capacity recovery can be achieved in a short period of time by detecting the capacity decrease in the battery during the discharge process. Thereby, effective charge of the battery is possible by minimal prolongation of the charging time.

Now, a mechanism for recovering the capacity by prolongation of the charging time will be described. The inventors have found out that, as a result of detailed investigation of the self-discharge reaction of the battery, the self-discharge reaction rate of the anode is faster than that of the cathode when the charge level of the anode is high, but the self-discharge reaction rate of the anode is slower than that of the cathode when the charge level of the anode is low.

Thus, the inventors have found out that the charge level of the anode is recovered to a state in which the self-discharge currents of the anode and the cathode are equal, if the charging time is prolonged when the capacity of the battery becomes low. In addition, the inventors have found out that the capacity decrease in the battery caused by decomposition of the electrolytic solution can be avoided without unnecessarily prolongation of the charging time by restoring the charging time to the original time after the capacity is recovered.

Based on the contents of the present invention as described above, each specific embodiment will be described and effects of the present invention will be clarified. Specific constituent materials and parts may be changed without departing from the scope of the present invention. Moreover, addition of known arts or replacement by known arts is possible, as long as the constituent elements of the invention are included.

[First Embodiment]

The module 201 shown in FIG. 2 was assembled by connecting eight cylindrical lithium-ion secondary batteries (single batteries) shown in FIG. 1 in series. A charge/discharge circuit 210, an arithmetic processing section 209, an external device 211 (apparatus for supplying electricity and loading) are connected to this module 201 to constitute the lithium-ion secondary battery system shown in FIG. 2. In a composition of an anode active material in the lithium-ion secondary battery, a ratio by weight of natural graphite and graphitizable carbon was set to 90:10. A cathode active material was $LiNi_{1/3}Mn_{1/3}CO_{1/3}O_2$.

Since the present embodiment is a test for determining advantage of the present invention, the electric supplying and loading apparatus which have both functions of supply and consumption of electric power was used as the external device 211 instead of an external power source or an external load. Use of the electric supplying and loading apparatus is not cause difference in the effects of the present invention, even compared with actual uses such as an electric car including an electric vehicle, a machine tool or a distributed energy storage system and a backup power source system.

A discharge curve of one lithium-ion secondary battery (one single battery) at the initial stage of the assembling is as shown in FIG. 3.

In a charge test just after assembling this system, charge current corresponding to 1-hour rate current value (15 A) was fed from the charge/discharge circuit 210 to the cathode external terminal 207 and the anode external terminal 208. The charge was performed at a constant voltage of 33.6 V for 1 hour. The value of the constant voltage is a value of eight times the value of 4.2 V. 4.2 V is the value of the constant voltage of the single battery as described previously. The electric power necessary for charge-discharge of the module was supplied from the external device (the apparatus for supplying electricity and loading) 211.

In a discharge test, current in the opposite direction of the charge test was fed from the cathode external terminal 207 and the anode external terminal 208 to the charge/discharge circuit 210 and the electric power was consumed in the external device (the apparatus for supplying electricity and loading) 211. The discharging current was set to a condition of 0.5-hour rate (30 A as the discharging current) and the discharge was performed until the voltage between the cathode external terminal 207 and the anode external terminal 208 reached 20 V. In the following description, the current value at 1-hour rate of 15 A in charge or discharge is mentioned as a standard.

In such conditions of the charge-discharge test as described above, the single battery 202 showed an initial performance of a charge capacity of 15.0 Ah and a discharge capacity of 14.9 Ah. The system in this embodiment is represented as S1.

Figure 5:
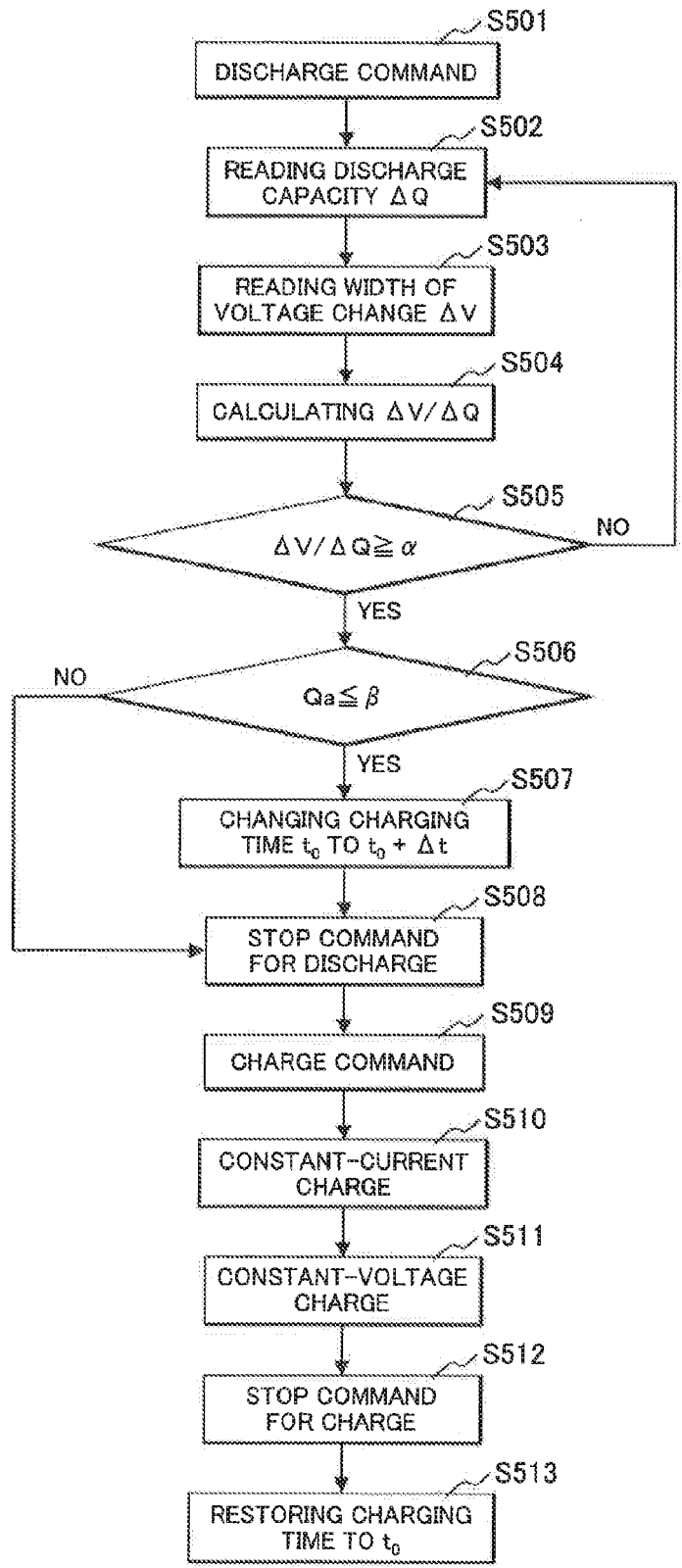
FIG. 5 shows an example of a charge-discharge control program which a lithium-ion secondary battery system of a first embodiment executes.

A flowchart of a charge-discharge control program executed by the lithium-ion secondary battery system according to this embodiment is shown in FIG. 5. FIG. 5 shows a typical example of a program which reads a discharge capacity $\Delta Q$ at a predetermined cycle time in the middle of discharge of the module 201; measures a width of voltage change (a changed amount in battery voltage) $\Delta V$ at this time; and detects the state of the battery from a ratio of $\Delta Q$ and $\Delta V$. The cycle time is set to 1 second in this embodiment and the cycle time can be changed within the range of obtaining the effects of the present invention.

In S501, a signal trigger for starting the discharge from the external is sent to the arithmetic processing section 209 and the arithmetic processing section 209 sends a discharge command to the charge/discharge circuit 210. Examples of the signal trigger include a signal which is sent when a gas pedal is pressed in an electric vehicle and a signal which a user can send to the system such as signals generated by a timer or a button switch in a distributed energy storage system. Every known art can be used as a method for sending the signal.

The charge/discharge circuit 210 may also start the discharge by directly receiving the signal trigger from the external.

After the discharge command, in S502, the arithmetic processing section 209 reads the discharge capacity $\Delta Q$ of the module 201. The discharge capacity $\Delta Q$ is read as a changed amount of the discharge capacity which is measured in each cycle time.

In S503, voltage of every single battery 202 included in the module 201 is read. A cycle time at reading the voltage is set to 1 second and a step size of the measurement in the arithmetic processing section 209 at a 0.5-hour rate is set to 8 mAh, and thereby a width of voltage change $\Delta V$ of the single battery 202 can be measured. When the description is made with reference to the voltage curve shown in FIG. 3 or FIG. 4, for example, a width of voltage change after a discharge capacity of 10 Ah is calculated in the arithmetic processing section 209. A rate of voltage change, which is a ratio of $\Delta V$ and $\Delta Q$ ($\Delta V/\Delta Q$), is calculated in the arithmetic processing section 209 (S504). From the voltage change at the end stage of discharge in FIG. 4, it is found that $\Delta V/\Delta Q$ increases with an increase of the integrated value of the discharge capacity.

The cycle time and the measurement parameter of the discharge capacity $\Delta Q$ exemplified in this embodiment can be set to any value. The integrated value of the discharge capacity $\Delta Q$ is calculated as a product of current value flown in the module 201 and time (here, being the same as the cycle time). An electronic device measuring the discharge capacity $\Delta Q$ can be configured by known components.

At the same time, in S503, the arithmetic processing section 209 measures a width of voltage change $\Delta V$ of the battery in each cycle time. The battery voltage may be a voltage of the whole module 201, more specifically, voltage between the terminals (the voltage between the cathode external terminal 207 and the anode external terminal 208) or may be obtained from the voltage of each single battery. An average value of each single battery is defined as $\Delta V$ in the latter case. Alternatively, when it is required to detect a single battery having a large capacity decrease in the early stage and recover its capacity, selecting the single battery having a large voltage change and determining the voltage as $\Delta V$ lead to more desirable effects. A battery having large $\Delta V$ can easily be detected by making a program which obtains a maximum value after measuring V of each single battery.

As an easier method, it is also possible that a single battery which is placed in a specific position is selected and a width of voltage change $\Delta V$ of the battery is measured. For example, if there is a region in the module 201 where the temperature tends to be high, a width of voltage change $\Delta V$ in a single battery in this region is monitored because the single battery in this region is likely to cause capacity decrease.

Subsequently, in S504, a rate of $\Delta V$ and $\Delta Q$, in other words, a ratio of voltage change $\Delta V/\Delta Q$ is calculated in the arithmetic processing section 209. A relation between $\Delta V$ and $\Delta Q$ can be represented as a polynomial expression or can be represented as any functions such as an exponential function and a logarithmic function. There is no limitation of function to implementation of the present invention as long as the function can determine whether the capacity decrease in the battery happens or not.

In S505, the arithmetic processing section 209 determines whether the battery characteristic satisfies a condition for changing the charge control parameter or not. The battery characteristic in S505 is $\Delta V/\Delta Q$ and the condition for changing the charge control parameter is $\Delta V/\Delta Q$ a by using a control value $\alpha$. Accordingly, a magnitude relation between $\Delta V/\Delta Q$ and the control value $\alpha$ is determined in the arithmetic processing section 209.

When the battery characteristic does not satisfy the condition for changing the charge control parameter, more specifically, $\Delta V/\Delta Q$ is smaller than $\alpha$, a degree of the capacity decrease is determined not so large as to be a problem (determined as "no") and the process returns to S502. When the battery characteristic satisfies the condition for changing the charge control parameter, more specifically, $\Delta V/\Delta Q$ is equal to or larger than $\alpha$, a degree of the capacity decrease is determined so large as to be a problem (determined as "yes") and the process proceeds to S506.

The control value $\alpha$ is a value which can be determined as any value, and the value is predetermined based on a balance between a capacity and a life of the battery or a degree of desired deterioration. The control value $\alpha$ can be changed depending on a combination of a material of the cathode and the anode.

Also in S506, the arithmetic processing section 209 determines whether the battery characteristic satisfies the condition for changing the charge control parameter or not. The battery characteristic in S506 is an integrated value Qa of the discharge capacity of the battery, and the condition for changing the charge control parameter is $Qa \leq \beta$ by using a control value $\beta$. More specifically, a magnitude relation between the integrated value Qa of the discharge capacity and the control value $\beta$ is determined in the arithmetic processing section 209. This is a determination step for distinguishing the case where the battery capacity is hardly decreased and the voltage is lowered by discharging Qa to almost the rated capacity as shown in FIG. 3 from the case where the battery capacity is decreased and the voltage is lowered in a smaller discharge capacity than the rated capacity as shown in FIG. 4. The former case is where Qa is larger than $\beta$ and the latter case is where Qa is equal to or smaller than $\beta$.

When the battery characteristic satisfies the condition for changing the charge control parameter, more specifically, when Qa is equal to or smaller than $\beta$, the process proceeds to S507. The battery characteristic does not satisfy the condition for changing the charge control parameter, more specifically, when Qa is larger than $\beta$, the process skips S507 to proceed to S508 and finishes the discharge.

The control value $\beta$, similar to the control value $\alpha$, is a value which can be determined as any value, and the value is predetermined based on a balance between a capacity and a life of the battery or a degree of desired deterioration. The control value $\beta$ can be changed depending on a combination of a material of the cathode and the anode.

The process in S506 is a process for distinguishing the rapid voltage change at the end stage of discharge shown in FIG. 3 from the moderate voltage change at the end stage of discharge shown in FIG. 4.

The process in S506 will be described in detail. In S506, the integrated value Qa of the discharge capacity from S501 to the time of determination in S506 is used. Qa is calculated as a product of a current value and time (here, being the same as the cycle time). An electronic device measuring the discharge capacity is configured by known components.

In this embodiment, $\alpha$ is set to 0.7 V/Ah and $\beta$ is set to 14 Ah. The process in S507 is preformed in such a manner that the process detects the moderate voltage change in FIG. 4, not accidentally detecting the rapid voltage change in FIG. 3.

In S507, the arithmetic processing section 209 changes the charge control parameter. In this embodiment, as one example, the charge control parameter is changed so as to prolong the normal charging time $t_0$ by $\Delta t$. In other words, the charging time is changed from $t_0$ to $t_0+\Delta t$. Here, $t_0$ is defined as the total time of constant-current charge and constant-voltage charge, which will be described later, when it is determined that the battery capacity does not cause problem. Even if $t_0$ is defined as the time for the constant-voltage charge, advantages of the present invention can be obtained. This is because the time for the constant-voltage charge contributes to recovery of the discharge capacity. $\Delta t$ should be predetermined. In this embodiment, $t_0$ is defined as the total time of the constant-current charge and the constant-voltage charge, and was set to 1.5 hours. $\Delta t$ was set to 0.5 hours.

In S508, a stop command for discharge is sent from the external and the charge/discharge circuit 210 stops the discharge of the module 201.

In the middle of the processes from S502 to S507, a user may send the stop command for discharge from the external at anytime and the process may directly proceed from S501 to S508. The process in S507 is not performed and the charge condition (the charging time in the example in FIG. 5) is not changed in this case.

When a charge command is sent from the external in S509, the constant-current charge starts in S510. Examples of the charge command include an external trigger by a braking signal such as pressing a brake pedal in an electric vehicle and a signal which a user can send to the system such as a signal generated by a timer or a button switch in a distributed energy storage system. Every known art can be used as a method for sending the signal. An example in which the lithium-ion secondary battery according to the present invention is applied to an electric vehicle will be described in the sixth embodiment.

In S510, when the voltage between the terminals of the module 201 reaches a value of a constant voltage previously set to the module 201, the process proceeds to S511 and the constant-voltage charge starts.

In S511, the constant-voltage charge continues until the charging time reaches a predetermined time. This predetermined time means the charging time $t_0+\Delta t$ determined in S507 when the process in S507 is performed or the charging time $t_0$ when process in S507 is not performed. In this predetermined time, the constant-current charge (S510) and the constant-voltage charge (S511) are performed.

In S512, when the charging time reaches this predetermined time, the arithmetic processing section 209 sends a stop command for charge to the charge/discharge circuit 210 to finish the charge.

In S513, the charging time is set to $t_0$ when the charge is finished. More specifically, when the process in S507 is performed, the charging time is restored from $t_0+\Delta t$ to $t_0$, and when the process in S507 is not performed, the charging time remains $t_0$.

After termination of the charge, a user can sends the discharge command to the arithmetic processing section 209, and thereby a series of the processes shown in FIG. 5 can be resumed.

When the capacity decrease of the battery is small and Qa is larger than $\beta$, the charging time remains $t_0$ and a series of the processes in FIG. 5 is repeated. The process in S513 is effective in avoiding excess charge and preventing the capacity decrease in the battery.

The charge-discharge control program as described above was executed in the arithmetic processing section 209 to operate the charge/discharge circuit 210 and thereby the charge-discharge cycle test of the module 201 was repeated. As a result, the discharge capacity of the single battery 202 maintained 14.4 to 14.8 Ah after 1000 cycles.

In this embodiment, the arithmetic processing section 209 was placed adjacent to the charge/discharge circuit 210 to incorporate in the system. When a frequency of the charge-discharge cycle is low, necessity to operate the arithmetic processing section 209 is low. As a result, it is sufficient to check a state of the battery just in a regular maintenance. Therefore, the arithmetic processing section 209 is detachable from the charge/discharge circuit 210, and is connected to the charge/discharge circuit 210 only when necessary. This operation has an advantage that a size of the lithium-ion secondary battery becomes small because the arithmetic processing section 209 is not connected in usual use.

In the lithium-ion secondary battery system in which the arithmetic processing section 209 is detachable, the arithmetic processing section 209 is connected to the charge/discharge circuit 210 using an external communication cable at the time of maintenance. Charge and discharge of the module 201 are performed and a status of the battery is checked. If the result of the check shows that the battery capacity is lowered, a change command signal for the charge control parameter, as shown in S506 in FIG. 5, is sent from the arithmetic processing section 209 to the charge/discharge circuit 210 in order to recover the discharge capacity of the module 201. After the discharge capacity is recovered, the arithmetic processing section 209 is detached from the system. This will eliminate the need for placing the arithmetic processing section 209 in the system when an application of the system has low frequency of the charge-discharge cycle, and will be useful for reducing the cost of the system.

[Second Embodiment]

In the second embodiment, five types of the lithium-ion secondary batteries are prepared in which only the composition of anode active material are different from the lithium-ion secondary battery in the first embodiment and the others are same. Compositions by weight of natural graphite (A) and graphitizable carbon (B), which are the anode active materials for the prepared five types of the lithium-ion secondary batteries, are enumerated in Table 1. Eight lithium-ion secondary batteries of each type were prepared, and modules were assembled by connecting eight batteries of the same type batteries in series to prepare five types of lithium-ion secondary battery systems shown in FIG. 2. For each of these systems, 1000 cycle of the charge-discharge test was performed in the same conditions in the first embodiment by using the arithmetic processing section 209 which executes the charge-discharge control program shown in FIG. 5. The battery capacities and the capacity retentions after the charge-discharge test were listed in Table 1.

TABLE 1

| Composition by weight (%) | | Battery capacity | capacity retention |
|---|---|---|---|
| A | B | (Ah) | (%) |
| 100 | 0 | 15.0 | 92 |
| 90 | 10 | 14.4 | 95 |
| 70 | 30 | 13.1 | 95 |
| 50 | 50 | 11.3 | 96 |
| 40 | 60 | 10.0 | 97 |

From Table 1, it is found that the higher the composition of natural graphite (A) is, the higher the advantage is in an increase in the battery capacity. This is because a width of the voltage drop at the end stage of discharge increases with an increase in the composition of graphitizable carbon (B) in the discharge curve shown in FIG. 4.

From the viewpoint of the life, the higher the composition of the graphitizable carbon (B) is, the more excellent the effect is. It is conceivable that this is because $\Delta V$ becomes to be easily detected in S503 in the flowchart shown in FIG. 5 since the width of the voltage drop at the end stage of discharge is larger in the discharge curve in FIG. 4.

Accordingly, the preferable composition of natural graphite (A) is 50-90% for a high capacity and high capacity retention. The present invention is applicable even when the composition of the graphite is without the range of the preferable composition described above and the range of the preferable composition is not necessarily an indispensable condition. The range out of the preferable composition may be acceptable as long as a required value or more of the battery capacity or the capacity retention required for the battery system can be attained.

COMPARATIVE EXAMPLE 1

A lithium-ion secondary battery system was prepared which included the module 201 shown in FIG. 2 and did not include the arithmetic processing section 209 according to the present invention, only repeating a common charge-discharge condition. In a composition of the anode active material, a weight ratio of natural graphite and graphitizable carbon was set to 90:10 as similar to the first embodiment. A charge-discharge control program of the system in this comparative example does not execute S502 to S506 in FIG. 5.

Without the arithmetic processing section 209, the charge-discharge cycle test of the module 201 was performed in the condition in which the charge-discharge control program is changed as described above. As a result, the discharge capacity of the single battery 202 was lowered to 12.7 to 13.1 Ah after 1000 cycles.

COMPARATIVE EXAMPLE 2

A lithium-ion secondary battery system was prepared which included the module 201 shown in FIG. 2 and did not include the arithmetic processing section 209 according to the present invention. In a composition of the anode active material, a weight ratio of natural graphite to graphitizable carbon was set to 90:10 as similar to the first embodiment. In the system in this comparative example, a microcomputer is connected to the charge/discharge circuit 210 and executes the charge-discharge control program to control the charge-discharge.

A charge-discharge control program of the system in this comparative example does not execute S502 to S506 in FIG. 5. In the charge-discharge control program in this comparative example, constant-voltage charge is performed for 1 hour after the voltage between the terminals of the module 201 reached 33.6 V, and 15 minutes of charge break time is provided. When the voltage after 15 minutes passed is lower than 33.2 V (in other words, lower than 4.15 V per single battery), additional charge will be preformed for another 1 hour. The constant-voltage charge for 1 hour and the charge break for 15 minutes are repeated until the voltage between the module terminals reaches 33.2 V. When the voltage between the module terminals becomes 33.2 V or higher, the charge is finished.

The charge-discharge cycle test of the module 201 was performed by controlling the charge/discharge circuit 210 with the above-described charge-discharge control program. As a result, the discharge capacity of the single battery 202 was lowered to 12.0 to 12.5 Ah after 1000 cycles. The reason why the capacity decrease becomes large is considered that the charge break time for measuring a charge termination voltage around full charge was accumulated and, as a result, the capacity decrease in the battery was accelerated.

COMPARATIVE EXAMPLE 3

A lithium-ion secondary battery system was prepared which included the module 201 shown in FIG. 2 and did not include the arithmetic processing section 209 according to the present invention. In a composition of the anode active material, a weight ratio of natural graphite to graphitizable carbon was set to 90:10 as similar to the first embodiment. In the system in this comparative example, a microcomputer is connected to the charge/discharge circuit 210 and executes the charge-discharge control program to control the charge-discharge.

A charge-discharge control program of the system in this comparative example does not execute S502 to S506 in FIG. 5. In the charge-discharge control program in this comparative example, constant-voltage charge is performed for 1 hour after the voltage between the terminals of the module 201 reached 33.6 V, and 15 minutes of charge break time is provided. When the voltage after 15 minutes passed is lower than 33.2 V (in other words, lower than 4.15 V per single battery), the charging voltage is increased to 34.4 V (4.3 V per single battery) and additional charge will be preformed for another 1 hour. The constant-voltage charge for 1 hour and the charge break for 15 minutes are repeated until the voltage between the module terminals reaches 33.2 V. When the voltage between the module terminals becomes 33.2 V or higher, the charge is finished.

The charge-discharge cycle test of the module 201 was performed by controlling the charge/discharge circuit 210 with the above-described charge-discharge control program. As a result, the discharge capacity of the single battery 202 was lowered to 11.3 to 11.7 Ah after 1000 cycles. The reason why the capacity decrease becomes large is considered that a decomposition reaction of the electrolytic solution or crystal change of the cathode active material was accelerated due to the high voltage at the constant-voltage charge.

[Third Embodiment]

Similar to the first embodiment, a module 201 shown in FIG. 2 was assembled by connecting eight cylindrical lithium-ion secondary batteries (single batteries) shown in FIG. 1 in series. The charge/discharge circuit 210, the arithmetic processing section 209, the external device 211 (apparatus for supplying electricity and loading) are connected to this module 201 to constitute the lithium-ion secondary battery system shown in FIG. 2. A discharge curve of one lithium-ion secondary battery (one single battery) at the initial stage of the assembling is as shown in FIG. 3.

The charge test and the discharge test just after assembling this system was performed in a way similar to the first embodiment. In these conditions of the charge-discharge test, the single battery 202 showed an initial performance of a charge capacity of 15 Ah and a discharge capacity of 14.8 to 14.9 Ah. The system in this embodiment is represented as S2.

Figure 6:
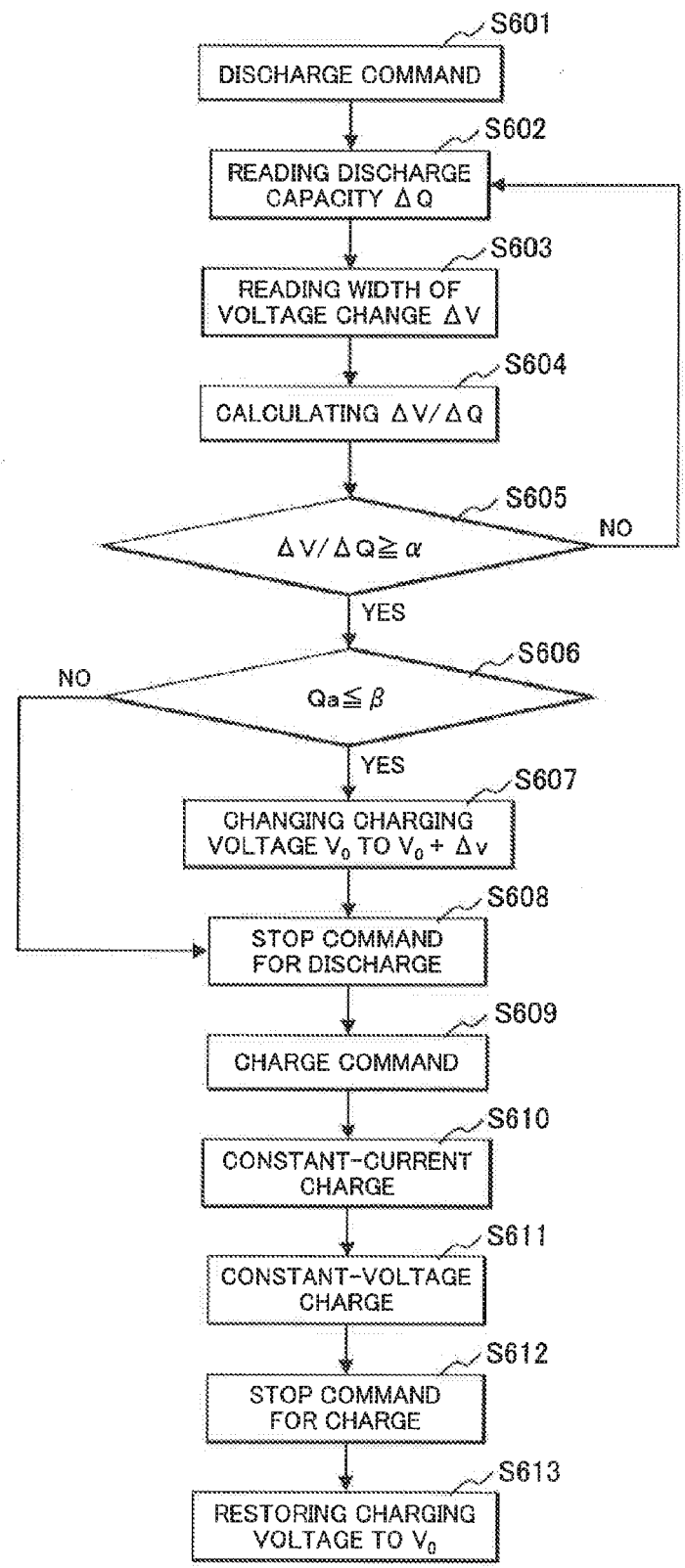
FIG. 6 shows an example of a charge-discharge control program which a lithium-ion secondary battery system of a third embodiment executes.

A flowchart of the charge-discharge control program in this embodiment is shown in FIG. 6. The charge-discharge control program in this embodiment has a similar configuration to the charge-discharge control program (FIG. 5) shown in the first embodiment. Symbols and technical functions which are not specifically noted in the following description are common to the first embodiment. Different points from the charge-discharge control program in the first embodiment will be described below.

The processes from S601 to S606 are same as those from S501 to S506 of the charge-discharge control program in the first embodiment and the step numbers thereof are also corresponding to each other.

In S607, the arithmetic processing section 209 changes the charge control parameter. In this embodiment, as one example, the charge control parameter is changed so as to increase a common charging voltage (charging voltage at the time of constant-voltage charge) $V_0$ by $\Delta v$. In other words, the charging voltage is changed from $V_0$ to $V_0+\Delta v$. Here, $V_0$ is equal to the charging voltage of the battery in the initial stage. $\Delta v$ is a width for adjusting the charging voltage and is predetermined. It should be noted that $\Delta v$ (a lower-case character) is different from the width of voltage change $\Delta V$ (an upper-case character) of the battery.

The processes from S608 to S612 are same as those from S508 to S512 of the charge-discharge control program in the first embodiment and the step numbers thereof are also corresponding to each other. However, the constant-voltage charge in S611 is performed at the charging voltage $V_0+\Delta v$, which has been changed, until the predetermined time ($t_0$). The charge is finished at the predetermined time in S612.

In S613, the charging voltage is set to $V_0$ when the charge is finished. More specifically, when the process in S607 is performed, the charging voltage is restored from $V_0+\Delta v$ to $V_0$, and when the process in S607 is not performed, the charging voltage remains $V_0$.

In this embodiment, $V_0$ was set to 33.6 V and $\Delta v$ is limited to 0.4 V (an increase by 50 mV per single battery). A total time of the constant-current charge and the constant-voltage charge is set to 1.5 hours. The control value $\alpha$ was set to 0.7 V/Ah, and the control value $\beta$ was set to 14 Ah.

When the capacity decrease in the battery is small and Qa is larger than $\beta$, the charging voltage remains $V_0$ of 33.6 V, avoiding excess charge and preventing the capacity decease in the battery.

The charge-discharge control program as described above was executed in the arithmetic processing section 209 to operate the charge/discharge circuit 210 and thereby the charge-discharge cycle test of the module 201 was repeated. As a result, the discharge capacity of the single battery 202 maintained 13.8 to 14.2 Ah after 1000 cycles.

[Forth Embodiment]

Similar to the first embodiment, a module 201 shown in FIG. 2 was assembled by connecting eight cylindrical lithium-ion secondary batteries (single batteries) shown in FIG. 1 in series. The charge/discharge circuit 210, the arithmetic processing section 209, the external device 211 (the apparatus for supplying electricity and loading) are connected to this module 201 to constitute the lithium-ion secondary battery system shown in FIG. 2. A discharge curve of one lithium-ion secondary battery (one single battery) at the initial stage of the assembling is as shown in FIG. 3.

In this embodiment, thermocouples or thermistors are attached to the center of the side face of each single battery 202, and temperatures of the side faces of eight batteries are measured to load the signals of the temperatures of the side faces into the arithmetic processing section 209. The arithmetic processing section 209 calculates an average value of the eight temperature data and executes the charge-discharge control program which monitors a time change of the average temperature and the discharge capacity.

The charge test and the discharge test just after assembling this system was performed in a way similar to the first embodiment. Here, in the discharge test, a discharging current was set to a condition of 0.25-hour rate (60 A as the discharging current), and the discharge was performed until the voltage between the cathode external terminal 207 and the anode external terminal 208 reached 20 V. In these conditions of the charge-discharge test, the single battery 202 showed an initial performance of a charge capacity of 15 Ah and a discharge capacity of 13.7 to 14.0 Ah. The system in this embodiment is represented as S3.

Figure 7:
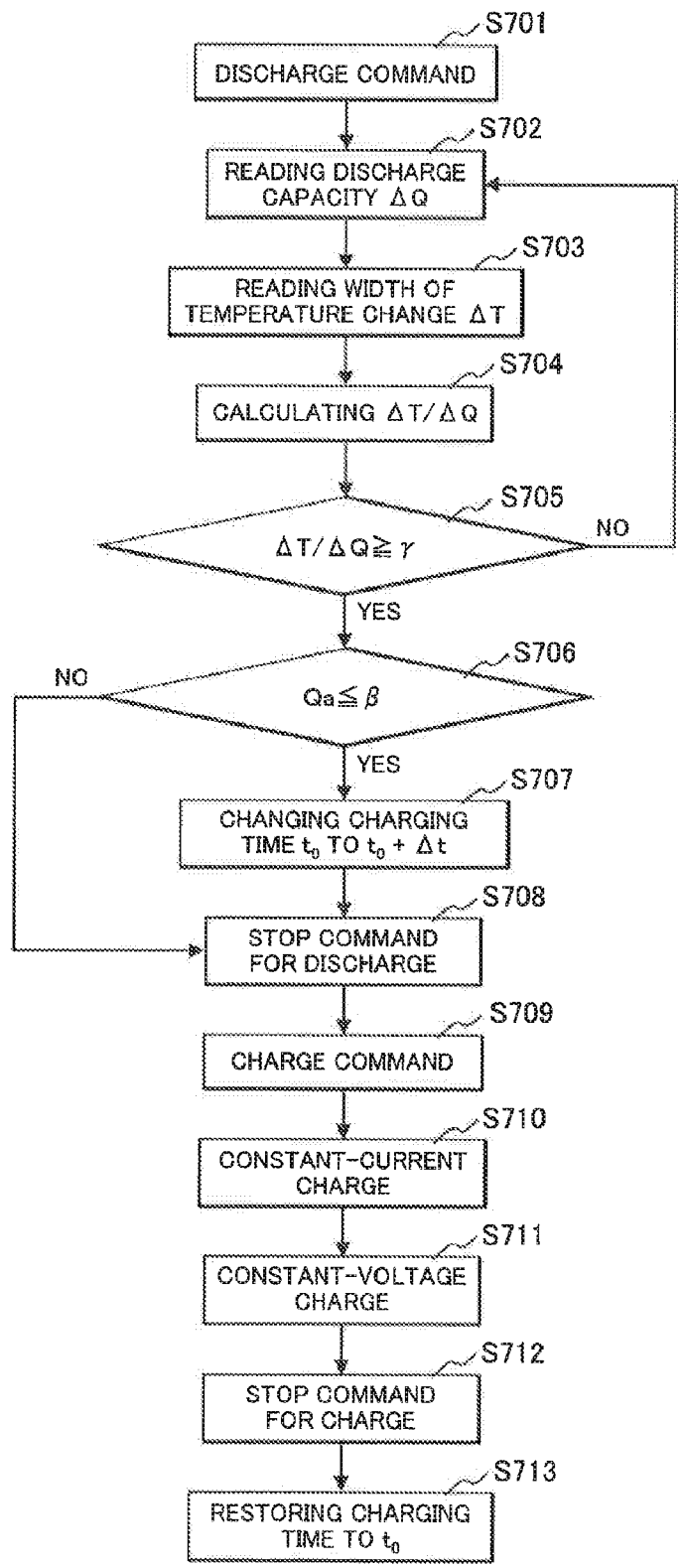
FIG. 7 shows an example of a charge-discharge control program which a lithium-ion secondary battery system of a forth embodiment executes.

A flowchart of the charge-discharge control program in this embodiment is shown in FIG. 7. The charge-discharge control program in this embodiment reads a discharge capacity $\Delta Q$ and a width of temperature change (an amount of change in time of the average temperature of the battery) $\Delta T$ at a predetermined cycle time in the middle of discharge of the module 201 and detects the state of the battery from a ratio of $\Delta Q$ and $\Delta T$. The cycle time is set to 1 second in this embodiment and the cycle time can be changed within the range of obtaining the effects of the present invention.

The charge-discharge control program in this embodiment has a similar configuration to the charge-discharge control program (FIG. 5) shown in the first embodiment. Symbols and technical functions which are not specifically noted in the following description are common to the first embodiment. Different points from the charge-discharge control program in the first embodiment will be described below.

The processes of S701 and S702 are corresponding to those of S501 and S502 of the charge-discharge control program in the first embodiment, respectively.

With reading the discharge capacity $\Delta Q$ in S702, the arithmetic processing section 209 measures and reads a width of temperature change $\Delta T$ of the battery in each cycle time in S703.

Subsequently, in S704, a ratio of $\Delta T$ and $\Delta Q$, in other words, $\Delta T/\Delta Q$ is calculated in the arithmetic processing section 209. A relation between $\Delta T$ and $\Delta Q$ can be represented as a polynomial expression or can be represented as any functions such as an exponential function and a logarithmic function. There is no limitation of function to implementation of the present invention as long as the function can determine whether the capacity decrease in the battery happens or not.

In S705, the arithmetic processing section 209 determines whether the battery characteristic satisfies a condition for changing the charge control parameter or not. The battery characteristic in S705 is $\Delta T/\Delta Q$ and the condition for changing the charge control parameter is $\Delta T/\Delta Q \geq \gamma$ by using a control value $\gamma$. Accordingly, a magnitude relation between $\Delta T/\Delta Q$ and the control value $\gamma$ is determined in the arithmetic processing section 209.

When the battery characteristic does not satisfy the condition for changing the charge control parameter, more specifically, $\Delta T/\Delta Q$ is smaller than $\gamma$, a degree of the capacity decrease is determined not so large as to be a problem (determined as "no") and the process returns to S702. When the battery characteristic satisfies the condition for changing the charge control parameter, more specifically, $\Delta T/\Delta Q$ is equal to or larger than $\gamma$, a degree of the capacity decrease is determined so large as to be a problem (determined as "yes") and the process proceeds to S706.

The control value $\gamma$ is a value which can be determined as any value, similar to the control value $\alpha$ in the first embodiment, and the value is predetermined based on a balance between a capacity and a life of the battery or a degree of desired deterioration. The control value $\gamma$ can be changed depending on a combination of a material of the cathode and the anode. In this embodiment, the control value $\gamma$ is set to 1.2° C./Ah at a discharge capacity of 13 Ah in the discharge curve shown in FIG. 3. Here, initial $\Delta T/\Delta Q$ at 13 Ah was 1.0° C./Ah.

The process of S706 is the same as that of S506 of the charge-discharge control program in the first embodiment.

In S707, the arithmetic processing section 209 changes the charge control parameter, similar to S507 in the first embodiment. More specifically, the charging time is changed from $t_0$ to $t_0+\Delta t$ so as to prolong the charging time by $\Delta t$. In this embodiment, $t_0$ means the total time of constant-current charge and constant-voltage charge, being set to 1.5 hours. $\Delta t$ was set to 0.5 hours.

The processes from S708 to S713 are corresponding to those from S508 to S513 of the charge-discharge control program in the first embodiment, respectively.

The charge-discharge control program as described above was executed in the arithmetic processing section 209 to operate the charge/discharge circuit 210 and thereby the charge-discharge cycle test of the module 201 was performed. The charge-discharge cycle test was finished after 1000 cycles. As described in the first embodiment, a discharge capacity in 0.25-hour rate was measured after a charge of 1-hour rate, and the discharge capacities before and after the charge-discharge test of 1000 cycles were compared in the same conditions. As a result, even after the charge-discharge cycle test, the discharge capacity of the single battery 202 maintained 13.7 to 14.1 Ah, which was the discharge capacity before the charge-discharge cycle test.

In S707, in which the charging time was changed from $t_0$ to $t_0+\Delta t$ as a change in the charge control parameter, the charging voltage may be changed from $V_0$ to $V_0+\Delta v$ as similar to S607 in the third embodiment. In this case, the processes from S708 to S713 are same as those from S608 to S613 in the third embodiment, respectively.

[Fifth Embodiment]

Similar to the first embodiment, a module 201 shown in FIG. 2 was assembled by connecting eight cylindrical lithium-ion secondary batteries (single batteries) shown in FIG. 1 in series. The charge/discharge circuit 210, the arithmetic processing section 209, the external device 211 (the apparatus for supplying electricity and loading) are connected to this module 201 to constitute the lithium-ion secondary battery system shown in FIG. 2.

The arithmetic processing section 209 in this embodiment has a function to integrate operation time of the module 201 and records the integrated time as the operation time $\Delta t_{aq}$. The operation time of the module 201 means an integrated time of time in which the module 201 actually charges and discharges, a charge break time (a stand-by time) of the module 201 and an unused time of the module 201. When it is determined that the charge break time or the unused time of the module 201 does not impinge on a capacity decrease of the battery, the charge break time or the unused time of the module 201 may be eliminated.

The unused time is measured only when the retention capacity remains in the module 201 and the module 201 can supply electric power to the arithmetic processing section 209. When the retention capacity does not remain, the unused time is not integrated because the electric power cannot be supplied to the arithmetic processing section 209. If the measurement of the unused time is eliminated in this way, this will not substantially cause a problem. This is because that the retention capacity does not remain is equivalent to that the single battery 202 is fully discharged and a side reaction such as decomposition of the electrolytic solution rarely occurs in such a case.

Conditions of the charge-discharge test are the same as the conditions in the first embodiment, and the single battery is charged at 1-hour rate and is discharged at 2-hour rate. In such conditions of the charge-discharge test as described above, the single battery 202 obtained an initial performance of a charge capacity of 15.0 Ah and a discharge capacity of 14.9 Ah. The system in this embodiment is represented as S4.

Figure 8:
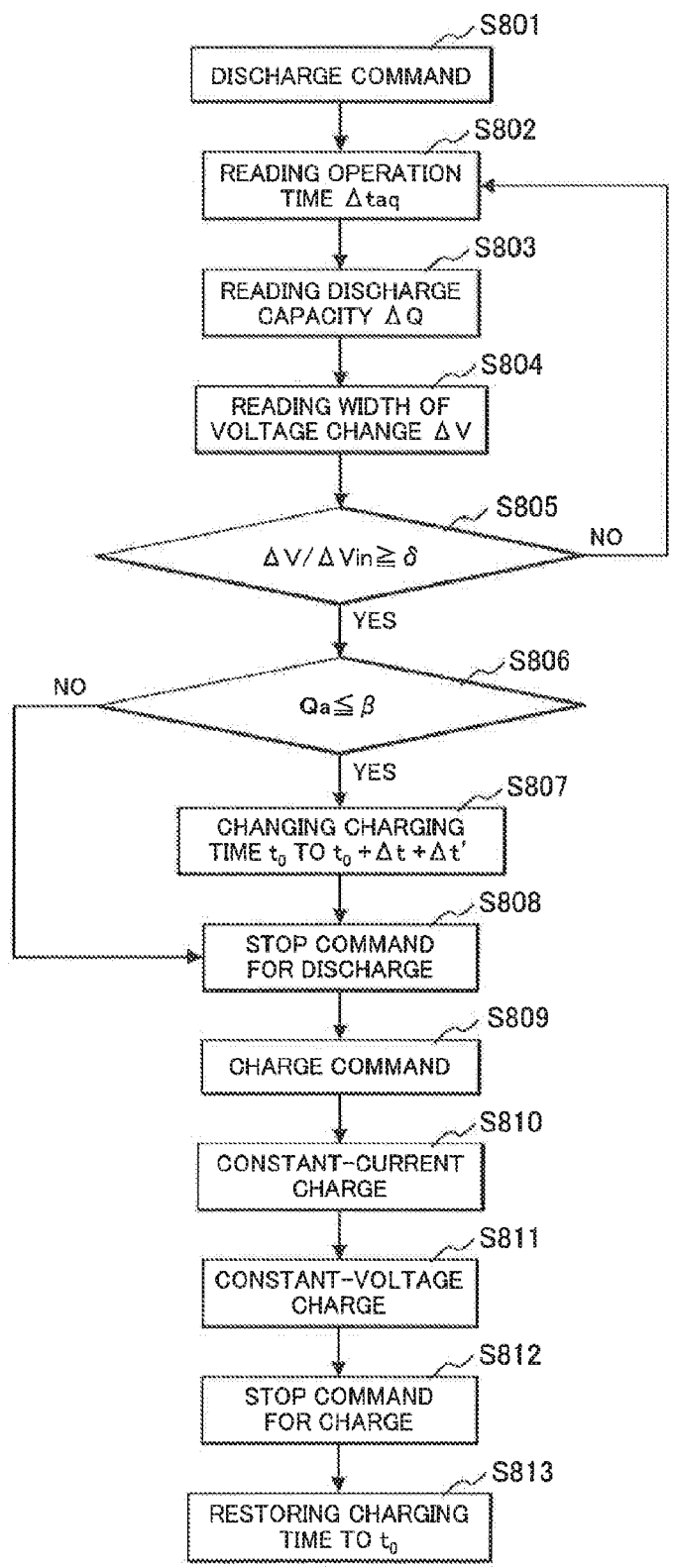
FIG. 8 shows an example of a charge-discharge control program which a lithium-ion secondary battery system of a fifth embodiment executes.

A flowchart of the charge-discharge control program in this embodiment is shown in FIG. 8. When the charge-discharge control program in this embodiment is compared with the charge-discharge control program (FIG. 5) shown in the first embodiment, S802 to S805 and S807 are different and the other steps are same. S802 to S805 and S807 which are different from the corresponding steps in the first embodiment will be described below. Symbols and technical functions which are not specifically noted in the following description are common to the first embodiment.

In S802 to S804 in FIG. 8, the operation time $\Delta taq$, the discharge capacity $\Delta Q$ and the width of voltage change $\Delta V$ are sequentially read in the middle of discharge of the module 201 in the predetermined cycle time. The cycle time is set to 1 second, which can be changed within the range of obtaining the effects of the present invention.

In S804, when the integrated value of $\Delta Q$ reaches the predetermined value, the width of voltage change $\Delta V$ is measured at the time. The width of voltage change $\Delta V$ is recorded in the arithmetic processing unit 209 as the initial value of the width of voltage change (the initial width of voltage change) $\Delta Vin$ only when the width of voltage change $\Delta V$ is measured for the first time. The initial width of voltage change $\Delta Vin$ is a width of voltage change at the time when the module 201 actually comes into use (in other words, at the time of factory shipment), and a width of voltage change in the initial state where the battery is not deteriorated.

In S805, the arithmetic processing section 209 determines whether the battery characteristic satisfies the condition for changing the charge control parameter or not. The battery characteristic in S805 is $\Delta V/\Delta Vin$ and the condition for changing the charge control parameter is $\Delta V/\Delta Vin \geq \delta$ by using a control value $\delta$. Accordingly, a magnitude relation between $\Delta V/\Delta Vin$ and the control value $\delta$ is determined in the arithmetic processing section 209.

When the battery characteristic does not satisfy the condition for changing the charge control parameter, in other words, $\Delta V/\Delta Vin$ is smaller than $\delta$, a degree of the capacity decrease is determined not so large as to be a problem (determined as "no") and the process returns to S802. When the battery characteristic satisfies the condition for changing the charge control parameter, more specifically, $\Delta V/\Delta Vin$ is equal to or larger than $\delta$, a degree of the capacity decrease is determined so large as to be a problem (determined as "yes") and the process proceeds to S806.

In this embodiment, $\Delta Vin$ was set to 6 mV when the discharge capacity of the single battery 202 is 13 Ah and the step size of measurement of the arithmetic processing section 209 is 8 mAh. Accordingly, the discharging current at 2-hour rate is 7.5 A and the discharge capacity per second is 2 mAh. When $\Delta V$ is changed in 1.5 mV or more per second, the process proceeds to S806 and the charge condition (the charging time in the example of FIG. 8) is changed.

The control value $\delta$ is a value which can be determined as any value, similar to the control value $\alpha$ in the first embodiment, and the value is predetermined based on a balance between a capacity and a life of the battery or a degree of desired deterioration. The control value $\delta$ is changed depending on the value of $\Delta Vin$, so that the control value $\delta$ is adjusted depending on the measurement conditions. The control value $\delta$ also can be changed depending on a material or a combination of the cathode and the anode. In this embodiment, an allowable value of an error in the measurement of the voltage was set to 10% and the control value $\delta$ is set to 1.1.

Then, S807 will be described. In S807, the arithmetic processing section 209 changes the charge control parameter. In this embodiment, as one example, the charge control parameter is changed so as to prolong the normal charging time $t_0$ by $\Delta t'+\Delta t'$. In other words, the charging time is changed from $t_0$ to $t_0+\Delta t'\Delta'$. Here, $\Delta t$ is a predetermined prolonged time and $\Delta t'$ is a compensated prolonged time depending on $\Delta taq$ which is read in S802. When the operation time $\Delta taq$ includes a time of the battery left for a short period from several days to about one month, $\Delta t'$ is set to zero or an extremely smaller value than $\Delta t$ so that the battery is not charged in unnecessary period and the capacity decrease in the battery is prevented. When $\Delta taq$ includes a time of the battery left for a longer period of one month or more and has a large value, $\Delta t'$ is set to a positive value.

When the capacity decrease in the battery is small and Qa is larger than $\beta$, the charging time remains $t_0$, avoiding excess charge and preventing the capacity decease in the battery.

The charge-discharge control program described above was executed in the arithmetic processing section 209 to operate the charge/discharge circuit 210 and thereby the charge-discharge cycle test of the module 201 was performed. As a result, the discharge capacity of the single battery 202 maintained 13.8 to 14.3 Ah after 1000 cycles.

In S807, the charging time was changed from $t_0$ to $t_0+\Delta t'\Delta t'$ as a change in the charge control parameter. Alternatively, the charging voltage may be changed from $V_0$ to $V_0+\Delta v$, similar to S607 in the third embodiment. In this case, the processes from S808 to S813 are same as those from S608 to S613 in the third embodiment, respectively.

[Sixth Embodiment]

Figure 9:
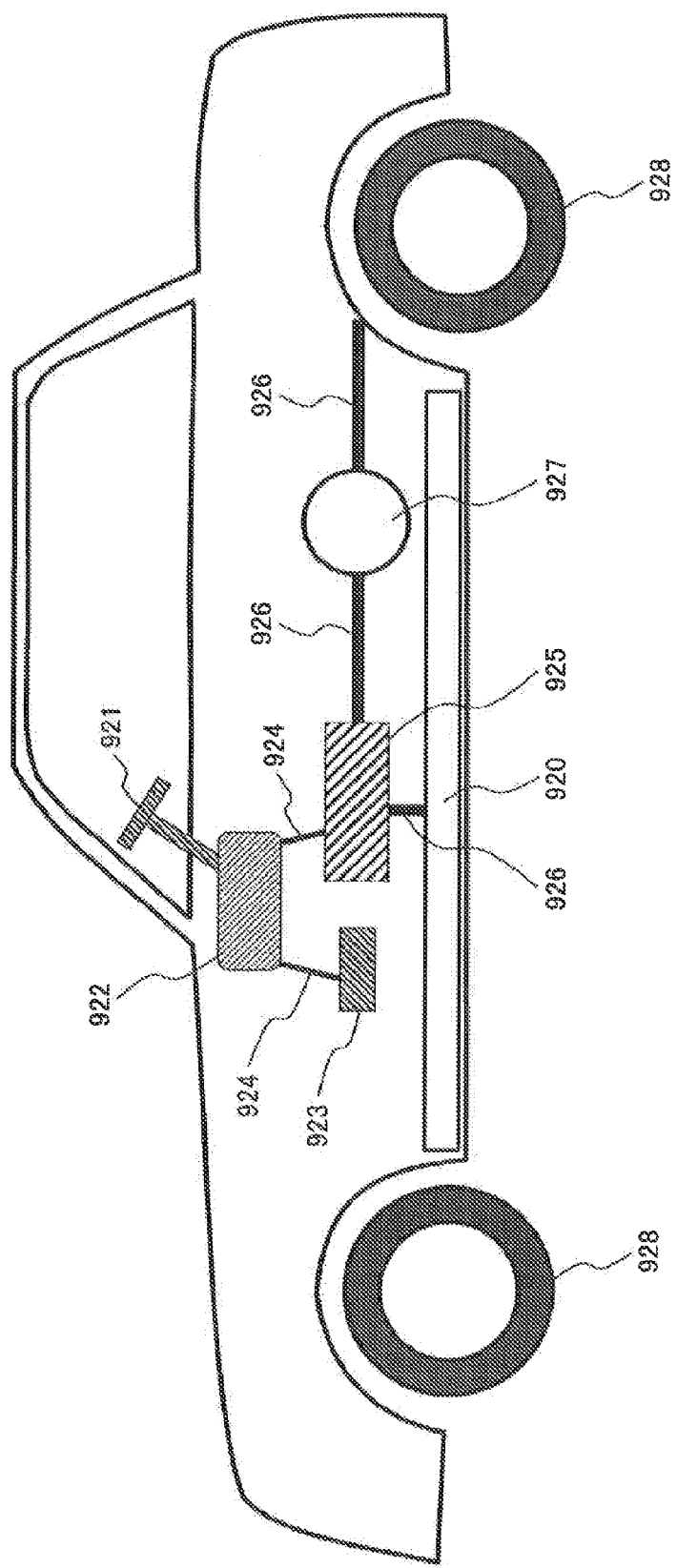
FIG. 9 shows a structural example of a drive system of an electric vehicle for which the lithium-ion secondary battery according to an embodiment of the present invention is applied.

With reference to FIG. 9, an embodiment is described in which the lithium-ion secondary battery system according to the present invention is applied to an electric vehicle. FIG. 9 shows a structure of the electric vehicle which mounts a drive system described in this embodiment.

Twelve modules are prepared which have the same specification described in the fifth embodiment. A battery 920 is manufactured by connecting the modules in series. The drive system is made which has the same configuration of the electric vehicle and includes the battery 920, a steering wheel 921, a control unit 922, a gas pedal 923, signal cables 924, a converter 925, and electric power cables 926. A motor 927 and wheels 928 of the electric vehicle is replaced with charge-discharge equipment. This charge-discharge equipment is corresponding to the external device 211 shown in FIG. 2. This equipment consumes electric power from the module 201 and supplies regenerative energy to the module 201. The control unit 922 has the arithmetic processing section 209 shown in the first embodiment.

A drive test is performed by using this drive system. The drive test is the same test as when the electric vehicle mounts the battery 920. The battery 920 can be placed at the bottom of the body of the electric vehicle.

When a driver operates the steering wheel 921 or presses the gas pedal 923, the control unit 922 transmits a signal to the converter 925 through the signal cable 924. The converter 925 arithmetically processes the signal transmitted from the control unit 922, increases or decreases an output from the battery 920, controls an amount of electricity consumption of the motor 927 through the electric power cable 926, and controls the wheels 928 to accelerate or brake the vehicle. Stored electric energy in the battery 920 is consumed at the time of acceleration, and electric energy can be taken in the battery 920 at the time of braking (regeneration is performed).

As described in the first embodiment to the fifth embodiment, the lithium-ion secondary battery system according to the present invention simulates actual use conditions of drive and storage of the electric vehicle. Accordingly, the electric vehicle using the battery according to the present invention can have large charge capacity for the battery 920 and can suppress a decreasing rate in the capacity which can be charged even when environmental temperature becomes high. Since the capacity of the module can be maintained high for long periods, the manufactured battery 920 can stably obtain long-life characteristic even under high temperature environment.

In the sixth embodiment, the application example for the electric vehicle has been described. Embodiments of the present invention are not limited to the above description. For example, the present invention also can be applied to a stationary electric power storage system. In this case, the capacity of the module can be maintained high for long periods and the manufactured battery 920 can stably obtain long-life characteristic even under high temperature environment.

What is claimed is:

1. A lithium-ion secondary battery system comprising:
   a lithium-ion secondary battery having a cathode, an anode including carbon, and a non-aqueous electrolyte [doesn't teach this];
   a charge/discharge circuit for putting the lithium-ion secondary battery on charge according to a charge control parameter; and
   an arithmetic processing section for controlling the charge/discharge circuit,
   wherein the arithmetic processing section obtains battery characteristics of the lithium-ion secondary battery, changes a value of the charge control parameter when the arithmetic processing section determines that the battery characteristics satisfies a condition for changing the charge control parameter, and restores the value of the charge control parameter to the value before the change when the charge for the lithium-ion secondary battery is finished,
   wherein the arithmetic processing section obtains an integrated value of a discharge capacity and a ratio of an amount of voltage change and the discharge capacity as the battery characteristics, changes the value of the charge control parameter when the arithmetic processing section determines that the ratio and the integrated value satisfy respective conditions for changing the charge control parameter, and restores the value of the charge control parameter to the value before the change when the charge for the lithium-ion secondary battery is finished.

2. The lithium-ion secondary battery system according to claim 1, wherein the arithmetic processing section increases time or voltage of constant-voltage charge which is the charge control parameter when the arithmetic processing section determines that the ratio and the integrated value satisfy respective conditions for changing the charge control parameter, and restores the time or the voltage of the constant-voltage charge to the value before the change when the charge for the lithium-ion secondary battery is finished.

3. The lithium-ion secondary battery system according to claim 1, wherein the arithmetic processing section obtains an integrated value of the discharge capacity and a ratio of a width of voltage change and a width of initial voltage change as the battery characteristics, increases time or voltage of constant-voltage charge which is the charge control parameter when the arithmetic processing section determines that the ratio and the integrated value satisfy respective conditions for changing the charge control parameter, and restores the time or the voltage of the constant-voltage charge to the value before the change when the charge for the lithium-ion secondary battery is finished.

4. The lithium-ion secondary battery system according to claim 1, wherein the arithmetic processing section is detachable.

5. The lithium-ion secondary battery system according to claim 1, wherein the anode includes a mixture of graphite and non-graphite carbon as an anode active material, and the cathode and the anode have different ratios of an amount of voltage change and a discharge capacity from each other.

6. The lithium-ion secondary battery system according to claim 5, wherein a charge capacity density per unit weight of the anode active material is 250 to 330 mAh/g when the lithium-ion secondary battery is charged to a rated capacity.

7. A lithium-ion secondary battery system comprising:
   a lithium-ion secondary battery having a cathode, an anode including carbon, and a non-aqueous electrolyte;
   a charge/discharge circuit for putting the lithium-ion secondary battery on charge according to a charge control parameter; and
   an arithmetic processing section for controlling the charge/discharge circuit,
   wherein the arithmetic processing section obtains battery characteristics of the lithium-ion secondary battery, changes a value of the charge control parameter when the arithmetic processing section determines that the battery characteristics satisfies a condition for changing the charge control parameter, and restores the value of the charge control parameter to the value before the change when the charge for the lithium-ion secondary battery is finished,
   wherein the arithmetic processing section obtains an integrated value of the a discharge capacity and a ratio of an amount of temperature change in time and the discharge capacity as the battery characteristics, increases time or voltage of constant-voltage charge which is the charge control parameter when the arithmetic processing section determines that the ratio and the integrated value satisfy respective conditions for changing the charge control parameter, and restores the time or the voltage of the constant-voltage charge to the value before the change when the charge for the lithium-ion secondary battery is finished.

8. The lithium-ion secondary battery system according to claim 7, wherein the arithmetic processing section increases time or voltage of constant-voltage charge which is the charge control parameter when the arithmetic processing section determines that the ratio and the integrated value satisfy respective conditions for changing the charge control parameter, and restores the time or the voltage of the constant-voltage charge to the value before the change when the charge for the lithium-ion secondary battery is finished.

9. The lithium-ion secondary battery system according to claim 7, wherein the arithmetic processing section obtains an integrated value of the discharge capacity and a ratio of a width of voltage change and a width of initial voltage change as the battery characteristics, increases time or voltage of constant-voltage charge which is the charge control parameter when the arithmetic processing section determines that the ratio and the integrated value satisfy respective conditions for changing the charge control parameter, and restores the time or the voltage of the constant-voltage charge to the value before the change when the charge for the lithium-ion secondary battery is finished.

10. The lithium-ion secondary battery system according to claim 7, wherein the arithmetic processing section is detachable.

11. The lithium-ion secondary battery system according to claim 7, wherein the anode includes a mixture of graphite and non-graphite carbon as an anode active material, and the cathode and the anode have different ratios of an amount of voltage change and a discharge capacity from each other.

12. The lithium-ion secondary battery system according to claim 11, wherein a charge capacity density per unit weight of the anode active material is 250 to 330 mAh/g when the lithium-ion secondary battery is charged to a rated capacity.

* * * * *